United States Patent
Cohen

(10) Patent No.: US 11,023,901 B2
(45) Date of Patent: Jun. 1, 2021

(54) METHOD AND/OR SYSTEM FOR PROVIDING AND/OR ANALYZING AND/OR PRESENTING DECISION STRATEGIES

(75) Inventor: Frederick B. Cohen, Livermore, CA (US)

(73) Assignee: MANAGEMENT ANALYTICS, INC., Pebble Beach, CA (US)

(*) Notice: Subject to any disclaimer, the term of this patent is extended or adjusted under 35 U.S.C. 154(b) by 0 days.

(21) Appl. No.: 12/198,011

(22) Filed: Aug. 25, 2008

(65) Prior Publication Data

US 2010/0145715 A1 Jun. 10, 2010

Related U.S. Application Data

(60) Provisional application No. 60/957,455, filed on Aug. 23, 2007.

(51) Int. Cl.
| | | |
|---|---|---|
| *G06Q 10/10* | (2012.01) | |
| *G06Q 10/06* | (2012.01) | |
| *G06Q 30/06* | (2012.01) | |
| *G06Q 30/02* | (2012.01) | |
| *G06Q 10/08* | (2012.01) | |
| *G06T 11/20* | (2006.01) | |

(52) U.S. Cl.
CPC .......... *G06Q 30/02* (2013.01); *G06Q 10/067* (2013.01); *G06T 11/206* (2013.01)

(58) Field of Classification Search
CPC .... G06Q 10/067; G06Q 50/182; G06Q 30/02; G06T 11/206
USPC .............. 705/1, 1.1–912, 309, 348
See application file for complete search history.

(56) References Cited

U.S. PATENT DOCUMENTS

| | | | | |
|---|---|---|---|---|
| 5,732,200 | A * | 3/1998 | Becker et al. | 358/1.15 |
| 5,812,128 | A * | 9/1998 | Sterling, IV | 715/762 |
| 5,926,794 | A * | 7/1999 | Fethe | G06Q 10/06393 705/7.39 |
| 6,188,403 | B1 * | 2/2001 | Sacerdoti | G06T 11/206 715/764 |
| 6,351,680 | B1 * | 2/2002 | Ali et al. | 700/109 |
| 6,507,766 | B2 * | 1/2003 | Khan | 700/109 |
| 6,535,775 | B1 * | 3/2003 | Bagepalli et al. | 700/109 |
| 6,647,400 | B1 | 11/2003 | Moran | |
| 6,771,293 | B1 * | 8/2004 | Josephson et al. | 715/804 |
| 6,980,927 | B2 | 12/2005 | Tracy | |
| 7,062,458 | B2 * | 6/2006 | Maggioncalda | G06Q 40/00 705/36 R |
| 7,496,533 | B1 * | 2/2009 | Keith | 705/37 |
| 7,660,705 | B1 * | 2/2010 | Meek et al. | 703/2 |
| 7,693,743 | B2 * | 4/2010 | Alasaarela | G06Q 10/06398 705/7.42 |

(Continued)

OTHER PUBLICATIONS

Cronje, Johannes, "Paradigms Regained: Toward Integrating Objectivism and Constructivism in Instructional Design and the Learning Sciences," ETR&D, vol. 54, No. 4, pp. 387-416, 2006. (Year: 2006).*

(Continued)

*Primary Examiner* — Jonathan P Ouellette
(74) *Attorney, Agent, or Firm* — DLA Piper LLP US

(57) ABSTRACT

A method and/or system that can be implemented on a computing device or tables or board game or otherwise uses a rule set to evaluate data about a situation and actors in order to provide advice regarding strategies for influencing actors and/or other outputs.

20 Claims, 19 Drawing Sheets

(56) References Cited

U.S. PATENT DOCUMENTS

| | | |
|---|---|---|
| 2001/0027455 A1* | 10/2001 | Abulleil et al. ............... 707/102 |
| 2002/0013720 A1* | 1/2002 | Ozono et al. ..................... 705/7 |
| 2002/0038321 A1* | 3/2002 | Keeley ................... G06F 17/24 |
| | | 715/234 |
| 2002/0042731 A1* | 4/2002 | King et al. ....................... 705/10 |
| 2003/0033191 A1* | 2/2003 | Davies et al. .................. 705/10 |
| 2003/0120577 A1* | 6/2003 | Sakui et al. ..................... 705/36 |
| 2003/0149571 A1* | 8/2003 | Francesco et al. ............... 705/1 |
| 2003/0208429 A1* | 11/2003 | Bennett ................. G06Q 40/06 |
| | | 705/36 R |
| 2003/0229509 A1* | 12/2003 | Hall et al. ......................... 705/1 |
| 2004/0030592 A1* | 2/2004 | Buck et al. ..................... 705/10 |
| 2004/0085316 A1* | 5/2004 | Malik .......................... 345/440 |
| 2004/0162752 A1* | 8/2004 | Dean et al. ..................... 705/10 |
| 2004/0210574 A1* | 10/2004 | Aponte et al. .................... 707/5 |
| 2004/0236655 A1* | 11/2004 | Scumniotales et al. ........ 705/36 |
| 2005/0004789 A1* | 1/2005 | Summers ....................... 703/22 |
| 2005/0043922 A1* | 2/2005 | Weidl et al. .................. 702/183 |
| 2005/0049987 A1* | 3/2005 | Meek et al. ..................... 706/46 |
| 2005/0091077 A1* | 4/2005 | Reynolds ......................... 705/1 |
| 2005/0209866 A1* | 9/2005 | Veeningen et al. ............... 705/1 |
| 2006/0085434 A1* | 4/2006 | Mah et al. ..................... 707/100 |
| 2006/0121436 A1* | 6/2006 | Kruse et al. ................... 434/433 |
| 2006/0129439 A1* | 6/2006 | Arlt et al. ......................... 705/7 |
| 2007/0239696 A1* | 10/2007 | Xu ............................ G09B 5/00 |
| 2008/0005677 A1* | 1/2008 | Thompson .................... 715/744 |
| 2008/0036767 A1* | 2/2008 | Janzen .......................... 345/440 |
| 2008/0140688 A1* | 6/2008 | Clayton et al. ............... 707/100 |
| 2008/0192056 A1* | 8/2008 | Robertson ............... G06T 13/80 |
| | | 345/440 |
| 2009/0006156 A1* | 1/2009 | Hunt et al. ........................ 705/7 |
| 2010/0274753 A1 | 10/2010 | Liberty et al. |
| 2016/0044057 A1 | 2/2016 | Chenette |

OTHER PUBLICATIONS

Smart et al., "Developing a decision-making framework for implementing purchasing synergy: a case study," International Journal of Physical Distribution & Logistics Management, vol. 37 No. 1, 2004. (Year: 2004).*

* cited by examiner

| S | Interpretation |
|---|---|
| | The decision is clear. The identified factors are very unfavorable and very important. The decision is highly unfavorable and should be opposed. |
| | The decision is high risk and unclear. Either it will be very bad or very good, and it is hard to tell which based on the available data. |
| | The decision is very unclear and important. The factors in the center top square should be evaluated and either split into multiple issues and properly replaced, or resolved and put in their proper places. A decision should be delayed until this is resolved. |
| | The decision is clear. The identified factors are very favorable and very important. The decision is highly supported. |
| | The decision has a lot of very important factors and they are not clarified enough to resolve this decision yet. The factors in the center top square should resolved. A decision should be delayed until this is resolved. The resulting decision is likely high risk. |
| | If the center top and either of the other top areas are heavily populated, it is likely that the decision will go toward the other populated top-level square. Additional factor resolution should be undertaken until sensitivity analysis shows that a different situation is present. |
| | Regardless of the rest of the situation, the decision has few or no important factors. Many factors will have to be analyzed in order to resolve the decision and it may not be worth the effort. Normalization may be used to move importance levels up if this is a simple decision. Another approach uses the same pattern matching as above on the medium importance level. |

*FIG. 3*

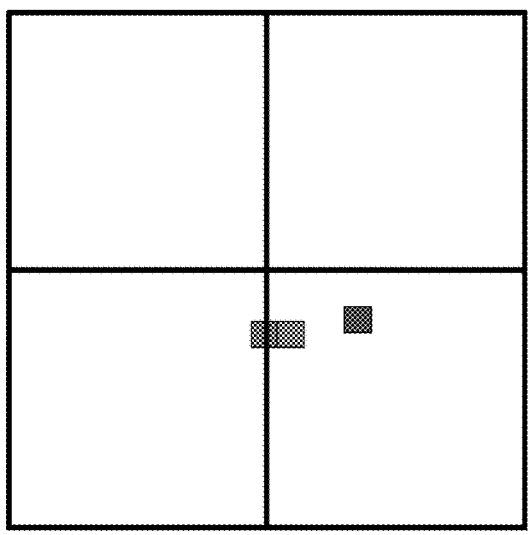

*FIG. 6 COG-ONLY DISPLAY*

1st option

| X | Opposed | Neutral | Supportive |
|---|---|---|---|
| Critical | | Item 5: Reputation | Item 0: Cost |
| Important | Item 4: Style | Item 1: Build time<br>Item 2: Beauty<br>Item 3: Size & site<br>MEAN: Unfavorable<br>COG: Unfavorable | |
| Irrelevant | | | |

2nd option

| X | Opposed | Neutral | Supportive |
|---|---|---|---|
| Critical | Item 0: Cost | Item 5: Reputation | Item 4: Build time |
| Important | | MEAN: Favorable<br>COG: Neutral | Item 3: Beauty |
| Irrelevant | Item 1: Style | | Item 2: Size & site |

3rd option

| X | Opposed | Neutral | Supportive |
|---|---|---|---|
| Critical | Item 2: Cost | | Item 3: Size & site |
| Important | | COG: Favorable<br>MEAN: Favorable<br>Item 5: Build time | Item 0: Beauty<br>Item 1: Reputation |
| Irrelevant | | | Item 4: Style |

Three alternatives presented in tic-tac-toe form

*FIG. 7*

| S | Interpretation |
|---|---|
| ▣ | The decision is clear. The identified factors are very unfavorable and very important. The decision is highly unfavorable and should be opposed. |
| ▣ | The decision is high risk and unclear. Either it will be very bad or very good, and it is hard to tell which it is based on the available data. |
| ▣ | The decision is very unclear and important. The factors in the center top square should be evaluated and either split into multiple issues and properly replaced, or resolved and put in their proper places. A decision should be delayed until this is resolved. |
| ▣ | The decision is clear. The identified factors are very favorable and very important. The decision is highly supported. |
| ▣ | The decision has a lot of very important factors and they are not clarified enough to resolve this decision yet. The factors in the center top square should resolved. A decision should be delayed until this is resolved. The resulting decision is likely high risk. |
| ▣ | If the center top and either of the other top areas are heavily populated, it is likely that the decision will go toward the other populated top level square. Additional factor resolution should be undertaken until sensitivity analysis shows that a different situation is present. |
| ▣ | Divide all of the numbers in the middle row by 2, add them into the numbers in the same column in the top row, and analyze as if the new top row it the only row with numbers. |

*FIG. 9*

REPORTS FOR MONKEY BARS INDUSTRIES BID

Factor Report

| Factor | Comment | Weight | Relative |
|---|---|---|---|
| Cost | The cost is within reasonable constraints and meets worst-case budgetary requirements | 61 | 24% |
| Build time | The amount of time it will take before the building is available for us. | 46 | 18% |
| Style | The building has a style that is to the liking of the donors. | 45 | 17% |
| Beauty | The building meets the standards of beauty that committee members and board members expect of a new project of this magnitude. | 36 | 14% |
| Size and site | The design meets the size requirements and the site requirements or exceeds them in beneficial ways. | 35 | 13% |
| MEAN | The MEAN | 29 | N/A |
| Reputation | Reputation of the architect. | 28 | 11% |
| COG | The Center of Gravity | 27 | N/A |

TicTacToe Report

| X | Opposed | Neutral | Supportive |
|---|---|---|---|
| Critical | | Item 5: Reputation | Item 3: Cost |
| Important | Item 0: Style | Item 4: Build time<br>Item 1: Beauty<br>Item 2: Size and site<br>MEAN The Mean: Unfavorable<br>COG The Center of Gravity: Unfavorable | |
| Irrelevant | | | |

Spreadsheet View
```
"Item 3", 7160, 2160, 61, 181.89100056846365, "24%", "Cost"
"Item 4", 3640, 3640, 46, 103.56773598195942, "18%", "Build time"
"Item 0", 3040, 5500, 45, 102.94153239699841, "17%", "Style"
"Item 1", 5780, 4360, 36, 157.33449, "14%", "Beauty"
"Item 2", 3600, 6420, 35, 117.73859999999999, "13%", "Size and site"
"MEAN",  4690, 4146, 29, 131.19035913135806, "0%",  "The Mean"
"Item 5", 4920, 2800, 28, 126.30100597692898, "11%", "Reputation"
"COG",   4832, 4010, 27, 133.685475117803,   "0%",  "The Center of Gravity"
```

*FIG. 10A*

| Rating | Decision | Matrix | Description | Risk | Dominance | Answer | Decided |
|---|---|---|---|---|---|---|---|
| 27 | Mokey | 0 1 1<br>1 3 0<br>0 0 0 | Favorable but not fully decided - resolve important unclear factors before decision. | Moderate | None | Favorable | Unclear |

Favorable presentation

| Item 3 | Cost | The cost is within reasonable constraints and meets worst-case budgetary requirements |
|---|---|---|
| Item 0 | Style | The building has a style that is to the liking of the donors. |
| Item 5 | Reputation | Reputation of the architect. |
| Item 4 | Build time | The amount of time it will take before the building is available for us. |
| Item 1 | Beauty | The building meets the standards of beauty that committee members and board members expect of a new project of this magnitude. |
| Item 2 | Size and site | The design meets the size requirements and the site requirements or exceeds them in beneficial ways. |
| Item 3 | Cost | The cost is within reasonable constraints and meets worst-case budgetary requirements |

Oppositional presentation

| Item 0 | Style | The building has a style that is to the liking of the donors. |
|---|---|---|
| Item 5 | Reputation | Reputation of the architect. |
| Item 4 | Build time | The amount of time it will take before the building is available for us. |
| Item 1 | Beauty | The building meets the standards of beauty that committee members and board members expect of a new project of this magnitude. |
| Item 2 | Size and site | The design meets the size requirements and the site requirements or exceeds them in beneficial ways. |
| Item 3 | Cost | The cost is within reasonable constraints and meets worst-case budgetary requirements |
| Item 0 | Style | The building has a style that is to the liking of the donors. |

*FIG. 10B*

Neutral presentation

| Item 5 | Reputation | Reputation of the architect. |
|---|---|---|
| Item 4 | Build time | The amount of time it will take before the building is available for us. |
| Item 1 | Beauty | The building meets the standards of beauty that committee members and board members expect of a new project of this magnitude. |
| Item 2 | Size and site | The design meets the size requirements and the site requirements or exceeds them in beneficial ways. |
| Item 3 | Cost | The cost is within reasonable constraints and meets worst-case budgetary requirements |
| Item 0 | Style | The building has a style that is to the liking of the donors. |
| Item 5 | Reputation | Reputation of the architect. |
| Item 4 | Build time | The amount of time it will take before the building is available for us. |
| Item 1 | Beauty | The building meets the standards of beauty that committee members and board members expect of a new project of this magnitude. |
| Item 2 | Size and site | The design meets the size requirements and the site requirements or exceeds them in beneficial ways. |

*FIG. 10C*

REPORT FOR MERCURY BUILDERS BID

Factor Report

| Factor | Comment | Weight | Relative |
|---|---|---|---|
| Size and site | The design meets the size requirements and the site requirements or exceeds them in beneficial ways. | 71 | 23% |
| Cost | The cost is within reasonable constraints and meets worst-case budgetary requirements | 64 | 21% |
| Beauty | The building meets the standards of beauty that committee members and board members expect of a new project of this magnitude. | 51 | 16% |
| COG | The Center of Gravity | 44 | N/A |
| MEAN | The MEAN | 44 | N/A |
| Reputation | Reputation of the architect. | 40 | 13% |
| Style | The building has a style that is to the liking of the donors. | 39 | 12% |
| Build time | The amount of time it will take before the building is available for us. | 37 | 12% |

TicTacToe Report

| X | Opposed | Neutral | Supportive |
|---|---|---|---|
| Critical | Item 1: Cost | | Item 2: Size and site |
| Important | | COG The Center of Gravity: Favorable<br>MEAN The Mean: Favorable<br>Item 5: Build time | Item 3: Beauty<br>Item 4: Reputation |
| Irrelevant | | | Item 0: Style |

Spreadsheet View

"Item 2", 8440, 2800, 71, 202.19459999999998, "23%", "Size and site"
"Item 1", 2760, 1800, 64, 67.5174089805118, "21%", "Cost"
"Item 3", 7520, 5020, 51, 167.31162, "16%", "Beauty"
"COG", 6488, 4326, 44, 164.75098140000003, "0%", "The Center of Gravity"
"MEAN", 6563, 4773, 44, 160.78056063749997, "0%", "The Mean"
"Item 4", 6980, 6320, 40, 148.08257999999998, "13%", "Reputation"
"Item 0", 7340, 6980, 39, 143.92633500000002, "12%", "Style"
"Item 5", 6340, 5720, 37, 148.75118999999998, "12%", "Build time"

*FIG. 11A*

| Rating | Decision | Matrix | Description | Risk | Dominance | Answer | Decided |
|---|---|---|---|---|---|---|---|
| 44 | Murcury | 1 0 1 <br> 0 1 2 <br> 0 0 1 | Favorable and unfavorable important factors - the decision is high risk. | High | None | Unknown | No |

Favorable presentation

| | | |
|---|---|---|
| Item 2 | Size and site | The design meets the size requirements and the site requirements or exceeds them in beneficial ways. |
| Item 3 | Beauty | The building meets the standards of beauty that committee members and board members expect of a new project of this magnitude. |
| Item 4 | Reputation | Reputation of the architect. |
| Item 0 | Style | The building has a style that is to the liking of the donors. |
| Item 1 | Cost | The cost is within reasonable constraints and meets worst-case budgetary requirements |
| Item 5 | Build time | The amount of time it will take before the building is available for us. |
| Item 2 | Size and site | The design meets the size requirements and the site requirements or exceeds them in beneficial ways. |
| Item 3 | Beauty | The building meets the standards of beauty that committee members and board members expect of a new project of this magnitude. |
| Item 4 | Reputation | Reputation of the architect. |

Oppositional presentation

| | | |
|---|---|---|
| Item 1 | Cost | The cost is within reasonable constraints and meets worst-case budgetary requirements |
| Item 5 | Build time | The amount of time it will take before the building is available for us. |
| Item 2 | Size and site | The design meets the size requirements and the site requirements or exceeds them in beneficial ways. |
| Item 3 | Beauty | The building meets the standards of beauty that committee members and board members expect of a new project of this magnitude. |
| Item 4 | Reputation | Reputation of the architect. |
| Item 0 | Style | The building has a style that is to the liking of the donors. |
| Item 1 | Cost | The cost is within reasonable constraints and meets worst-case budgetary requirements |

*FIG. 11B*

Neutral presentation

| Item 5 | Build time | The amount of time it will take before the building is available for us. |
|---|---|---|
| Item 1 | Cost | The cost is within reasonable constraints and meets worst-case budgetary requirements |
| Item 2 | Size and site | The design meets the size requirements and the site requirements or exceeds them in beneficial ways. |
| Item 3 | Beauty | The building meets the standards of beauty that committee members and board members expect of a new project of this magnitude. |
| Item 4 | Reputation | Reputation of the architect. |
| Item 0 | Style | The building has a style that is to the liking of the donors. |
| Item 5 | Build time | The amount of time it will take before the building is available for us. |

*FIG. 11C*

REPORT FOR THE SCOPES DESIGN BID

General Report

| Factor | Comment | Weight | Relative |
|---|---|---|---|
| Cost | The cost is within reasonable constraints and meets worst-case budgetary requirements | 76 | 24% |
| Beauty | The building meets the standards of beauty that committee members and board members expect of a new project of this magnitude. | 57 | 18% |
| Build time | The amount of time it will take before the building is available for us. | 52 | 16% |
| Reputation | Reputation of the architect. | 44 | 14% |
| Size and site | The design meets the size requirements and the site requirements or exceeds them in beneficial ways. | 39 | 12% |
| Style | The building has a style that is to the liking of the donors. | 38 | 12% |
| MEAN | The MEAN | 30 | N/A |
| COG | The Center of Gravity | 25 | N/A |

TicTacToe Report

| X | Opposed | Neutral | Supportive |
|---|---|---|---|
| Critical | Item 0: Cost | Item 5: Reputation | Item 4: Build time |
| Important | | MEAN The Mean: Favorable<br>COG The Center of Gravity: Neutral | Item 3: Beauty |
| Irrelevant | Item 1: Style | | Item 2: Size and site |

Spreadsheet View

```
"Item 0", 1340, 2080, 76, 44.313479302410585, "24%", "Cost"
"Item 3", 7620, 4040, 57, 179.27469000000002, "18%", "Beauty"
"Item 4", 6740, 3300, 52, 178.218225, "16%", "Build time"
"Item 5", 5900, 2340, 44, 147.50404811464043, "14%", "Reputation"
"Item 2", 7920, 7420, 39, 143.71392, "12%", "Size and site"
"Item 1", 2860, 6900, 38, 104.81978735988483, "12%", "Style"
"MEAN", 5396, 4346, 30, 149.67960445449165, "0%", "The Mean"
"COG", 5110, 3968, 25, 140.1931132126191, "0%", "The Center of Gravity"
```

| Rating | Decision | Matrix | Description | Risk | Dominance | Answer | Decided |
|---|---|---|---|---|---|---|---|
| 25 | Scopes | 1 1 1<br>0 0 1<br>1 0 1 | Important favorable, unfavorable, and neutral! Clarify the neutral before making the decision. | High | None | Unclear | No |

*FIG. 12A*

Favorable presentation

| Item 4 | Build time | The amount of time it will take before the building is available for us. |
|---|---|---|
| Item 3 | Beauty | The building meets the standards of beauty that committee members and board members expect of a new project of this magnitude. |
| Item 2 | Size and site | The design meets the size requirements and the site requirements or exceeds them in beneficial ways. |
| Item 0 | Cost | The cost is within reasonable constraints and meets worst-case budgetary requirements |
| Item 1 | Style | The building has a style that is to the liking of the donors. |
| Item 5 | Reputation | Reputation of the architect. |
| Item 4 | Build time | The amount of time it will take before the building is available for us. |
| Item 3 | Beauty | The building meets the standards of beauty that committee members and board members expect of a new project of this magnitude. |

Oppositional presentation

| Item 0 | Cost | The cost is within reasonable constraints and meets worst-case budgetary requirements |
|---|---|---|
| Item 1 | Style | The building has a style that is to the liking of the donors. |
| Item 5 | Reputation | Reputation of the architect. |
| Item 4 | Build time | The amount of time it will take before the building is available for us. |
| Item 3 | Beauty | The building meets the standards of beauty that committee members and board members expect of a new project of this magnitude. |
| Item 2 | Size and site | The design meets the size requirements and the site requirements or exceeds them in beneficial ways. |
| Item 0 | Cost | The cost is within reasonable constraints and meets worst-case budgetary requirements |

Neutral presentation

| Item 5 | Reputation | Reputation of the architect. |
|---|---|---|
| Item 0 | Cost | The cost is within reasonable constraints and meets worst-case budgetary requirements |
| Item 4 | Build time | The amount of time it will take before the building is available for us. |
| Item 3 | Beauty | The building meets the standards of beauty that committee members and board members expect of a new project of this magnitude. |
| Item 1 | Style | The building has a style that is to the liking of the donors. |
| Item 2 | Size and site | The design meets the size requirements and the site requirements or exceeds them in beneficial ways. |
| Item 5 | Reputation | Reputation of the architect. |

*FIG. 12B*

| Rating | Decision | Matrix | | | Description | Risk | Dominance | Answer | Decided |
|---|---|---|---|---|---|---|---|---|---|
| 44 | Murcury | 1 | 0 | 1 | Favorable and unfavorable important factors - the decision is high risk. | High | None | Unknown | No |
| | | 0 | 1 | 2 | | | | | |
| | | 0 | 0 | 1 | | | | | |
| 27 | Mokey | 0 | 1 | 1 | Favorable but not fully decided - resolve important unclear factors before decision. | Moderate | None | Favorable | Unclear |
| | | 1 | 3 | 0 | | | | | |
| | | 0 | 0 | 0 | | | | | |
| 25 | Scopes | 1 | 1 | 1 | Important favorable, unfavorable, and neutral! Clarify the neutral before making the decision. | High | None | Unclear | No |
| | | 0 | 0 | 1 | | | | | |
| | | 1 | 0 | 1 | | | | | |

*FIG. 13*

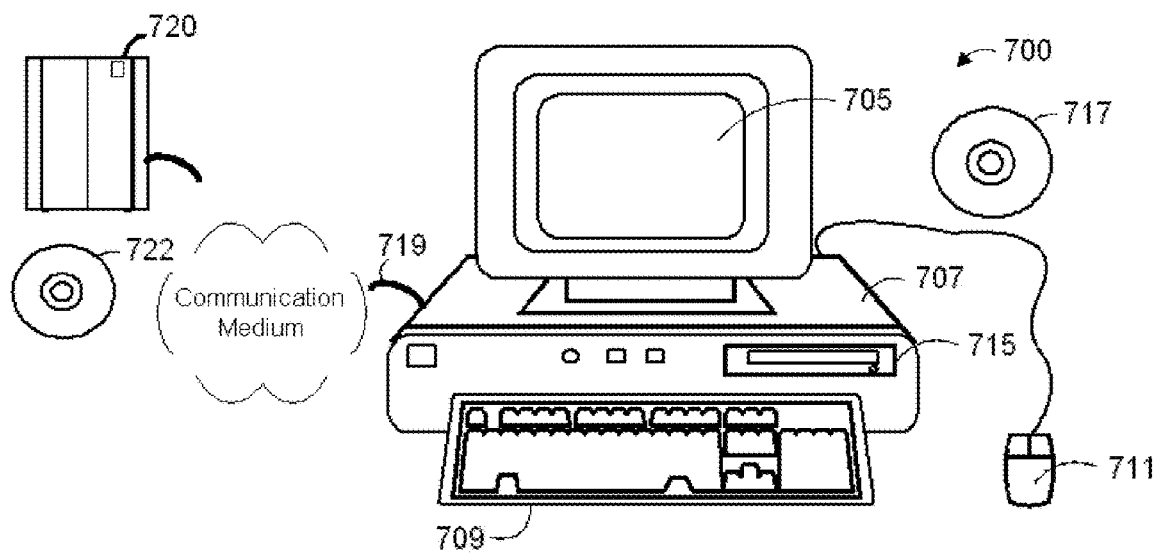

*FIG. 14*

METHOD AND/OR SYSTEM FOR PROVIDING AND/OR ANALYZING AND/OR PRESENTING DECISION STRATEGIES

CROSS REFERENCE TO RELATED APPLICATIONS

This application claims priority from provisional patent application 60/957,455, filed 23 Aug. 2007 and incorporated herein by reference.

COPYRIGHT NOTICE

Illustrative embodiments of the present invention are described below. In various embodiments, the present invention may be implemented in part using program source code, using graphical interfaces, or using written tables, manuals, or other instructions. Thus, portions of material included in this submission is copyrightable and copyright is claimed by the inventor. Permission is granted to make copies of the figures, appendix, and any other copyrightable work solely in connection with the making of facsimile copies of this patent document in accordance with applicable law; all other rights are reserved, and all other reproduction, distribution, creation of derivative works based on the contents, public display, and public performance of the application or any part thereof are prohibited by the copyright laws.

PRECAUTIONARY REQUEST TO FILE AN INTERNATIONAL APPLICATION, DESIGNATION OF ALL STATES, AND STATEMENT THAT AT LEAST ONE APPLICANT IS A UNITED STATES RESIDENT OR ENTITY

Should this document be filed electronically or in paper according to any procedure indicating an international application, Applicant hereby requests the filing of an international application and designation of all states. For purposes of this international filing, all inventors listed on a cover page or any other document filed herewith are applicants for purposes of United States National Stage filing. For purposes of this international filing, any assignees listed on a cover page or any other document filed herewith are applicants for purposes of non-United States national stage filing, or, if no assignee is listed, all inventors listed are applicants for purposes of non-United States national stage filing. For purposes of any international filing, applicants state that at least one applicant is a United States resident or United States institution. Should this application be filed in as a national application in the United States, this paragraph shall be disregarded.

COLOR DRAWINGS

The file of this patent may contain a least one drawing executed in color. Copies of this patent with color drawings will be provided by the United States Patent and Trademark Office upon request and payment of the necessary fee.

APPENDIX

This application is being filed with a source code appendix comprising example computer program source code listings according to specific embodiments of the present invention. The entire contents of this appendix is incorporated herein by reference.

FIELD OF THE INVENTION

The present invention relates to methods and/or systems involving strategies for identifying, understanding, and presenting factors (generally, different thoughts or ideas) in a given situation towards identifying or justifying a decision and/or a desired selection or selections or outcome. In specific embodiments, the invention has applications in the field of decision-making and/or information processing methods and/or information systems and/or games and entertainments. More specifically, the present invention in various aspects is directed to methods and/or systems that provide advice and other judgments or evaluations related to the making of decisions by individuals or groups in common situations.

SUMMARY OF THE INVENTION

The invention in its various specific aspects and embodiments involves methods and/or systems and/or modules that provide a variety of different functions relating to analyzing factors associated with decisions. In various embodiments, the invention provides novel methods and/or modules useful in supporting groups and individuals in decision-making by applying results of social science and other research as may exist now or in the future in a systematic and practical manner so as to guide, instruct, or otherwise provide information about how to influence factors and their presentation to support decision-making and/or decision guiding objectives.

According to specific embodiments, methods of the invention can include one or more of: providing clarifying presentations of factors for visual examination; providing advice to a user of the method for influencing individuals or groups relative to decisions or decision options; providing an entertaining and/or educational environment for one or more users or players to learn about methods and effectiveness of decision-making processes; provide entertainment relating to the influencing factors of individuals or groups; and tracking progress in sets of factors that influence individual or group decisions over time, e.g., for the purpose of evaluating particular strategies, evaluating a user's performance, performing simulations, or keeping score in a entertainment or educational game setting.

In specific embodiments, the invention involves methods and/or systems and/or modules that provide a way to apply the social science results and other results as may exist now or from time to time in a systematic and practical manner so as to instruct students or entertain individuals and groups about how factors influence groups in order to achieve objectives.

Tracking Progress

In specific embodiments, the invention involves methods and/or systems and/or modules that provide a way to track status and/or progress over time so as to guide, instruct, or otherwise assist individuals or groups about how perceptions of factors influence other individuals or groups in order to achieve objectives.

One example implementation of the invention is provided in the Source Code Appendix submitted with this specification. This example provides a logic processing system that receives as inputs information about situations and factors, in this example using a graphical user interface, and uses provides a means for a user or group to evaluate how those factors inform a decision. Other optional features illustrated by example in the Appendix or included in alternative embodiments of the invention include storing of situations and data sets for presentation, analysis, and/or evaluation, performing a scoring function for a user or multiple users, providing means for weighting or valuing various data elements, etc.

A further understanding of the invention can be had from the detailed discussion of specific embodiments below. For purposes of clarity, this discussion may refer to devices, methods, and concepts in terms of specific examples. However, the method of the present invention may operate with a wide variety of types of devices. It is therefore intended that the invention not be limited except as provided in the attached claims.

Furthermore, it is well known in the art that logic or software systems or systematized methods can include a wide variety of different components and different functions in a modular fashion. Different embodiments of a system can include different mixtures of elements and functions and may group various functions as parts of various elements. For purposes of clarity, the invention is described in terms of systems that include many different innovative components and innovative combinations of components. No inference should be taken to limit the invention to combinations containing all of the innovative components listed in any illustrative embodiment in the specification, and the invention should not be limited except as provided in the embodiments described in the attached claims.

Various aspects of the present invention are described and illustrated in terms of graphical interfaces and/or displays that user will use in working with the systems and methods according to the invention. The invention encompasses the general software steps that will be understood to those of skill in the art as underlying and supporting the functional prompts and results illustrated. In other embodiments, the invention can be implemented as a kit involving various instructions and movable components.

All publications cited herein are hereby incorporated by reference in their entirety for all purposes. The invention will be better understood with reference to the following drawings and detailed description.

The discussion of any work, publications, sales, or activity anywhere in this submission, including any documents submitted with this application, shall not be taken as an admission that any such work constitutes prior art. The discussion of any activity, work, or publication herein is not an admission that such activity, work, or publication existed or was known in any prior jurisdiction.

The approach identified here is useful for a wide range of decision processes and appears to reduce or eliminate many of the cognitive error mechanisms that commonly occur in decision processes of this sort. It provides advantages over other tools in its ease and speed of use, the ability to do real-time decision support and help to facilitate group processes, its use in distributed applications, and its ability to retain contemporaneous records of what individuals get out of interactions.

REFERENCES

[1] Bob Fellows, "Easily Fooled", Mind Matters, PO Box 16557, Minneapolis, Minn. 55416, 2000
[2] Thomas Gilovich, "How We Know What Isn't So: The fallibility of human reason in everyday life", Free Press, NY, 1991
[3] Charles K. West, "The Social and Psychological Distortion of Information", Nelson-Hall, Chicago, 1981.
[4] Al Seckel, "The Art of Optical Illusions", Carlton Books, 2000.
[5] Chester R. Karrass, "The Negotiating Game", Thomas A. Crowell, New York, 1970.
[6] Robert B. Cialdini, "Influence: Science and Practice", Allyn and Bacon, Boston, 2001.
[7] Charles Handy, "Understanding Organizations", Oxford University Press, NY, 1993.
[8], "Age of Propaganda",
[9] Aldert Vrij, "Detecting Lies and Deceipt", Wiley, New York, N.Y., 2000.
[10] Fred Cohen et. al., "A Framework for Deception", Computers and Security, [date]
[11] Fred Cohen, "Frauds, Spies, and Lies", ASP Press, 2005.
[12] Anna Grandori, "A Prescriptive Contingency View of Organizational Decision-Making", Administrative Science Quarterly V29 (1984) pp 192-209
[13] Alexander P. Power and Daniel J. Power, "Framework", http://www.dssresources.com/
[14] Thomas Saaty, "The Analytical Hierarchy Process", McGraw-Hill, New York, 1980.
[15] Toshiyuki Asahi, David Turo, and Ben Shneiderman, "Using Treemaps to Visualize the Analytic Hierarchy Process", Information Systems Research V6#4, December 1995, pp 357-375,
[16] Peer Soelberg, "Unprogrammed Decision Making", Academy of Management Proceedings, 1966, p 3-16.
[17] Gilles Coppin, Frederic Cadier, and Philippe Lenea, "Some considerations of cognitive modeling for collective decision support", Proc 40th Hawaii Int. Conf. on Systems Sciences, 2007.
[18] Charles Handy, "Understanding Organizations", Oxford University Press, NY, 1993.
[19] Also included by reference is U.S. patent application Ser. No. 11/591,725 (2007-0156814 A1) filed Nov. 1, 2006 METHOD AND/OR SYSTEM FOR PROVIDING AND/OR ANALYZING INFLUENCE STRATEGIES and all of the related material provided therein.

BRIEF DESCRIPTION OF THE DRAWINGS

FIG. 3 illustrates a shape table that identifies different situations (S) and interpretations of those situations in light of the locations in the space of heavily favored factors according to specific embodiments of the invention.

FIG. 6 illustrates multiple options next to each other by only displaying the COGs of each according to specific embodiments of the invention.

FIG. 7 illustrates a tic-tac-toe style for analysis of overall shapes according to specific embodiments of the invention.

FIG. 9 illustrates a table such as can be used to read the analysis of the decision according to specific embodiments of the invention.

FIG. 10A-C illustrates example reports for a first example museum design option according to specific embodiments of the invention.

FIG. 11A-C illustrates example reports for a second example museum design option according to specific embodiments of the invention.

FIG. 12A-B illustrates example reports for a third example museum design option according to specific embodiments of the invention.

FIG. 13 illustrates an example sorted matrix summary report related to the previous three figures according to specific embodiments of the invention.

FIG. 14 illustrates a representative example logic device in which various aspects of the present invention may be embodied or that can be used to provide interface to a system according to the invention.

DESCRIPTION OF SPECIFIC EMBODIMENTS

Figure 1A:
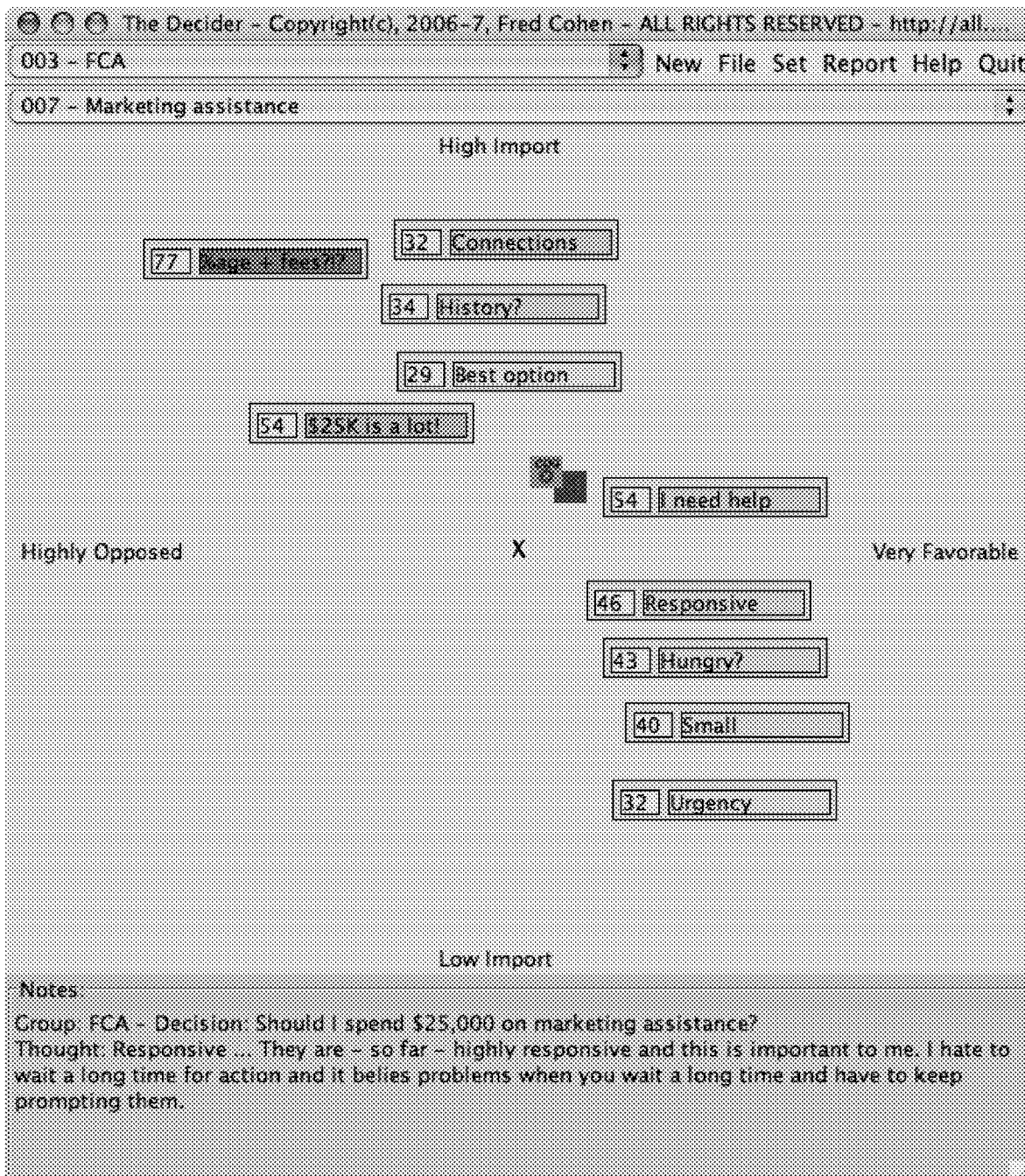
FIG. 1A-C illustrates screenshots of an example graphical interface with interactive factor objects and data input and advice presentation and data output fields allowing factor related data to be input and presented interactively according to specific embodiments of the present invention.

Before describing the present invention in detail, it is to be understood that this invention is not limited to particular compositions or systems, which can, of course, vary. It is also to be understood that the terminology used herein is for the purpose of describing particular embodiments only, and is not intended to be limiting. As used in this specification and the appended claims, the singular forms "a", "an" and "the" include plural referents unless the content and context clearly dictates otherwise. Thus, for example, reference to "a device" includes a combination of two or more such devices, and the like. Unless defined otherwise, technical and scientific terms used herein have meanings as commonly understood by one of ordinary skill in the art to which the invention pertains. Although any methods and materials similar or equivalent to those described herein can be used in practice or for testing of the present invention, the preferred materials and methods are described herein. Unless the context requires otherwise, throughout the specification and claims which follow, the word "comprise" and variations thereof, such as, "comprises" and "comprising" are to be construed in an open, inclusive sense, that is as "including, but not limited to." The headings provided herein are for convenience only and do not interpret the scope or meaning of the claimed invention.

Overview of Social Research Regarding Decision-Making

People make decisions all the time; from when to wake in the morning, to what to eat, to what to wear, to when to speak on what topic to whom. Almost everything they do is the result of a series of decisions make, in many cases, in real time, and often without more than a moment of consideration. Decision support is about supporting decision processes in people, and as such, it has the potential to affect every aspect of peoples' lives.

There are many ways in which decisions can be supported. Education and training are, in essence, decision support activities. They are designed to help people make structured decisions associated with historical outcomes. For example, when trained in how to drive a car, people learn to drive on the appropriate side of the road, how to signal other people regarding turns, how fast they can go and still stop in time to avoid a crash, and so forth. Decision support tools are used in every aspect of modern society and come in a wide array of forms and formats. Hard coded fixed decision aides are used for everything from determining what fire extinguisher to use on what sort of fire to emergency management pamphlets, to signs telling people which way to go as they drive.

With the advent of computers, more complex, information-intensive, and variable decision support has become feasible. While tables and manual calculators, like slide rules or dive computers, allow rapid and accurate analysis of fixed situations, computers provide a vast array of content that can be selectively applied with automated calculation and graphic presentation suited to the specific situation in less space and with less weight. This means that hand-held decision support systems (DSS) are available and that more and more complex functions can be supported for improved performance against select criteria. For example, automated calendars and scheduling systems allow individuals to remember thousands of appointments scheduled over months to come and support interactions between calendars of individuals to support group meeting schedules. Real-time adaptation of data driven decisions such as computers to support flight control and warning systems provide real-time situation-dependent warnings with advice about what to do.

1. Error Mechanisms and Mitigation

Errors are fundamental to human nature. Error modes in human mental processes have been studied extensively, categorized, and written about. In some cases, these errors can be traced to specific physiological mechanisms, while in other cases, the mechanisms are not clearly understood yet and may never be. An intriguing aspect of decision support is the notion that, because computers are designed to not make specific kinds of errors, the combination of people with computers in proper fashion might be able to dramatically reduce the error rates in their combined decision-making relative to some measurement of what constitutes an error. Errors like forgetting are substantially reduced by DSSs in select areas, as evidenced, for example, by the use of checklists for pilots and the resulting reduction in missed steps in flight safety and operations that resulted. The sorts of decisions and operations that these sorts of mechanisms help to make consistent, however, tend to be mundane and well practiced sequences that are very specifically designed to meet a specific need, tried, practiced, and repeated again and again. They are not the sorts of decisions that are made one time or in which the true value and impact of the decision is unknown.

Error mechanisms in human cognition have been summarized quite well elsewhere, including several excellent books on the subject related to the present effort. The reader is referred to sources extant [1][2][3][4][5][6][7][8][9][10][11]. Summarizing from the table of contents [11], error mechanism categories associated with decision-making are summarized and organized to include, but certainly are not limited to:

Tendency toward oversimplification
The misperception of random events
Incomplete or inadequate data misinterpretation
Bias laid on ambiguous and inconsistent data
Motivational determinants of belief
The biasing effect of second hand information
Exaggerated impressions of social support
Reciprocation
Authority
Contrast
Automaticity
Commitment and consistency
Social proof
Liking
Scarcity In order to attempt to reduce errors, or as it is more commonly stated "improve decisions", in the space of one-time decisions with unknown future value, DSSs have been introduced. They have the capacity to reduce certain types of errors and have proven successful at doing so to the limited extent that experimental evidence has been produced to make such a determination. For example, systems that force pairwise comparative evaluation of specified issues help to reduce or eliminate certain aspects of the tendency toward oversimplification in cases where the user does not think of things that the process forces them to contemplate. However, systems that force structure and limit the decision process, for example to predefined sets of factors, inherently create oversimplification in that they fail to recognize the full complexity of the issue. All such systems balance forcing factor about certain aspects of the decision against inhibiting factor about other aspects. The biasing effect of any structure inherent to such a DSS impacts the decision makers (DMs) and their decisions. Indeed many DSS approaches are defined specifically to limit idea generation and process deviation in favor of generating desired results in a timely fashion, and all DSS approaches are designed to structure decisions in some manner, if only by the inherent structure of the existence of a system at all.

2. Approaches and Axes

Most overall DSSs are comprised of components. These components ultimately form processes with tools that help to support and enforce procedures and people that define, operate, execute, and maintain the process. When discussing such systems in the literature, many authors describe elements of the overall DSSs as if they were the overall system. When using the term DSS we are typically discussing subsystems of an overall DSS. Many different approaches have been taken in this regard and exploration has been done on many axes. These axes include, but are not limited to:

Objective vs. Subjective: Objective systems use factual ground truth in the form of countable numerical absolute values to describe characteristics of alternatives and elements of alternatives and apply these numerical values rigorously to produce numerical outputs. Subjective systems take approximate input, typically from people, and use them in a relative fashion to produce orderings or weightings and outputs that are typically visualizable or numerical to low accuracy and in regions of the output decision space.

Quantitative vs. Qualitative: Typically, objective systems are quantitative and subjective systems are qualitative in that the quantitative systems tend to use numerical values while qualitative systems use softer notional regions of space. Computerized DSSs tend to use quantitative calculation methods for any analytical process because it is the nature of the machines and their programmers to perform quantitative calculations very fast and systematically. Human decisions, except in very well defined areas tend to be qualitative in nature.

Nominal vs. Ordinal vs. Interval vs. Ratio Metrics: Nominal consists only of lists of things with no basis for formal comparison. Most human-oriented DSSs have some form of nominal metrics in the form of ideas, options, or other sets of possibilities that don't have any formal basis in an underlying scientific model. Ordinal implies a partial ordering. Most DSS support some sort of comparison between like things or alternatives and this produces ordinal metrics. Interval implies the ability to count things, but not against any standard. Many DSS provide for inputs in the form of counts of different sorts, used for things like voting. Ratio implies the ability to add, subtract, compare, and normalize to a common zero value. Almost all DSSs use ratio-based calculations, even if the underlying metrics are not ratio-based.

Hierarchical vs. Flat: The Analytical Hierarchy Process (AHP) [14] is the most common example of a hierarchical DSS in which decisions are broken down into options, each of which has different aspects, each of which may have different aspects, and so forth. Tree maps and similar technologies apply hierarchies in a visualization approach to present hierarchies to users in terms of the ratios of different ordinal or interval values. [15] Flat DSSs don't support hierarchies and simply compare options.

Simple vs. Complex Decisions: Simple decisions involve a yes or no answer with regard to a single issue. Complex decisions may offer many alternatives and may include structural interdependencies. Complex decisions typically include mechanisms like expert systems while simpler DSSs are data driven rather than rule-driven.

Explanatory vs. Predictive: Explanatory systems tend to explain what has happened or present a decision in light of its formulation. As such it tends to support human and group decision processes by helping the individual or group make their decision based on what they know or can formulate. Predictive systems tend to use modeling and simulation or analytical methodologies to try to anticipate future conditions.

Group vs. Individual: Group DSSs are designed to collect information from multiple sources or support group processes in order to resolve issues, while individual systems are typically designed to help a single individual make better decisions.

Casual vs. Formal: Formal systems use predefined sets of items to formalize a specific well-defined process. Casual systems allow the user flexibility in how they characterize the decision and carry it out. This is sometimes described in terms of programmed vs. unprogrammed decision-making [16] in which the DM has or lacks rules for making the decisions.

Text-based vs. Visualization-based: Text-based systems take inputs in the form of tables or data entry forms and produce outputs in lists, charts, or similar representations and tend to do calculations to provide outputs that are meaningful in the sense of word-based advice or decisions. Visual systems take inputs in terms of graphical interfaces designed to use the visual processing of the user to perform portions of the computation and analysis.

Tactical vs. Strategic: While many characterizations have been made of tactical vs. strategic decisions, tactical DSSs tend to be automated DMs that take inputs and determine and present results at a rapid tempo. Strategic decision systems tend to support more factorful processes that take time, involve deliberative processes, and don't have predefined input to output analytical processes without intervention.

Optimizing vs. Satisficing vs. Incremental vs. Cybernetic vs. Random Decision Model: The decision model drives the basis for how decisions are ultimately made. [12] Optimizing models are based on the notion that ration metrics are applied against formal mathematical equations to yield defined optima against an agreed optimization criteria. Satisficing models use stated objectives and independent constraints that must be satisfied and are characterized by search of a space for selection of acceptable decisions followed by other criteria used for selecting between the feasible solutions. In some cases the criteria is the first feasible solution found. Incremental models search for increasingly effective options, often by variation of parameters surrounding an initial feasible solution. This is a form of local optimization. The cybernetic model is a misnomer associated with using historical data to assess alternatives. The random model is like it sounds, picking anything available.

Communication vs. Data vs. Model vs. Knowledge vs. User Driven: Different supply and demands drive DSSs. [13] Communications-Driven DSSs emphasize communications, collaboration and shared decision-making support. Data-driven DSSs emphasizes access to and manipulation of a time-series of internal company data and sometimes external data. Document-Driven DSSs focus on the retrieval and management of unstructured documents. Knowledge-Driven DSSs suggest or recommend actions based on built-in or otherwise supported knowledge bases. Model-Driven DSSs emphasize access to and manipulation of a model, for example, statistical, financial, optimization and/or simulation models.

Evaluation criteria: DSSs have different evaluation criteria. The most common specific criteria include risk and reward, cost and benefit, and importance and probability, but there are a wide range of evaluation criteria used and almost every different system uses some variation on this theme.

Interaction rates and operational tempo: Interaction rates go from beyond human speed (interactions happen faster than humans can support or be involved in), through reflex speed (typically under 0.5 seconds), trained response speed (0.2 to 1 second), cognitive resonance speed (1 to a few seconds), consideration speed (a few seconds to minutes), group consideration speed (minutes to days), analysis speed (days or longer), or too long for typical human decision processes. As a rule, tools that can operate at a higher speed can also operate at a lower speed, however, for automated systems, lower rates may cause system failures. Tempo encompasses the continuous usage rate for operations that continue over defined but substantial periods of time. Tempo is typically limited by the rate of use and reuse of tools, effects of exhaustion and rejuvenation, and other human and machine factors. Any DSS that is to support an operational mode must be able to continue to operate at the operational tempo or the system will collapse and it will inhibit effective decision-making rather than support it.

Amplitude vs. architecture: Amplitude decisions are associated with continuously variable spaces in which the relative or absolute quantities of continuous values are selected. Architecture decisions are associated with different approaches or structures that can be used to meet the needs of a situation. Amplitude decisions are most commonly encountered in engineering or financial decisions surrounding mixes of components or sizing. Architecture decisions are most commonly used when human decision-makers are involved and the decisions are between a finite set of distinct alternatives.

3. Decision Processes

DSSs typically operate as subsystems in overall decision processes. These processes may be more or less formalized and are generally described in the literature. At a detailed level, each specific process is quite specific, however, there are classes of processes defined in terms of human activity that are generally descriptive of different approaches taken to characterize the process of individuals and groups in the context of specific types of decisions they make or support.

Designed decision processes are typically developed over long time frames based on well-defined and highly repeatable processes that have been increasingly automated to the point where the precise information required, how it is to be analyzed, and the resulting outputs to the point where every step of the process is well understood, completely defined, and repeatably executable. They may have any number of explicitly defined steps, feedback processes, retracing of steps to find and correct errors, and so forth. The set of specific processes for these are large indeed, but they generally involve only gathering of specified inputs, analysis, and presentation of results. The reason for the simplicity of the process at the overall level is that the structuring and design of the system eliminate all of the other sorts of steps that are involved in less well-defined decision processes. There are no real variations and, to the extent feasible, these systems are nearly completely automated.

Personal decision processes Individuals have any number of different decision processes associated with purely personal issues. They include but are not limited to:

Processes that are completely unstructured, such as coin flips or "how I feel today" decisions.

Processes completely unrelated to facts, such as dogmatic decisions imposed by religious beliefs.

Processes based on minimal investigation, such as decisions to go somewhere based on a rumor of a famous person being there.

Processes with minimal steps, such as checking with a spiritual advisor and a relative before making a decision.

In other cases, individual decisions involve other individuals or groups, and social interactions must be considered. For example, asking someone to get married typically involves consideration of interactions both at present an in the future, factors about alternatives, predictive notions about having children or financial considerations, and so forth. Most such decisions involve weighing different factors, however the processes involved are typically not systematic or structured. They almost never involve making pictures or doing calculations with numbers.

Expertise and business-level decision processes. Many individuals use more structured processes, but these are predominantly used for business-related decisions and not for personal decisions. They may be mandated by the business owner or may be applied to help increase the certainty with which the decision made is beneficial to the DM. A well meaning DM within a business context may use formalized processes to do the best they can for the business. But without some training or experience, individual DMs tend to be highly unstructured and tend to miss many important issues. According to [17] individual DMs may come with different levels of expertise, including naive, novice, expert, and professional. Specific qualities attributed to an expert include; (1) familiarity with the decision-making task, (2) knowledge of how to structure the decision, (3) the ability to "make sense out of chaos, (4) the ability to convince colleagues of a decision hierarchy, (5) a tendency to process a smaller amount of information and get a better result, (6) the processing of decisions in short term memory while using strategies from long-term memory.

Somehow the expert creates and measures options based on attractiveness and importance and is able to make judgments about the relative attractiveness and importance of different strategic approaches, or alternatives using different techniques. Notions of how experts think about issues have been proposed, including (1) the structure of attractiveness scales, commensurability of those scales, and ordering of preferences that lead to metric spaces for analysis, (2) the search for dominance of one strategy over another, (3) the creation of computational models to weigh alternatives in a metric space. All such approaches create some set of defined attributes and seek to compare them to each other in order to associated the decision with improved sets of or values of those attributes in a decision space. These attributes are sometimes called classifiers. The definition of attributes and weighing of those attributes appear to be fundamental to any expert decision process.

Group decision processes involve a lot of complex issues that are problematic for automated support. [17] Some loosely defined processes and strategic games, such as day after games and prosperity games, are used in group processes and fall under this category, even though they do have somewhat formalized processes associated with them. These game approaches tend to use situational problems to induce people to generate large numbers of options and then reduce, weigh, or sort the options by consensus. These processes are typically designed to come to a set of options and then select from among them in a limited time frame. One such process [17] asserts that the generic process consists of clearly identifying the issue at hand, identifying options for addressing the issue, gaining comments and viewpoints on the options, identifying relationships between items, and associating contribution levels to the items. Comments in this context then to be either supportive or opposed to the option.

At a more generic level, it may be reasonably asserted that decision processes consist of some or all of the parts of the following list:

Identifying the issue to be decided. The DSS can augment normal human activities by structuring these elements of the process or can facilitate the process by helping to gather, retain, and present information.

Generating options (or simple decisions). The DSS can provide information to assist in not missing options or facilitate the entry, retention, tracking, and presentation of options.

Identifying attributes (or factors) of interest to each decision. The DSS can provide information to assist in the generation of attributes or facilitate the entry, retention, and presentation of attributes.

Weighing those factors relative to some scales and/or to each other. The DSS can provide information to help weight those factors or facilitate entry, retention, and presentation of the weighting process.

Using the weights as a basis for asserting a decision. The DSS can perform analysis to propose or enforce asserted decisions and facilitate retention and presentation of decisions.

Explaining or justifying the decision. The DSS can facilitate explanation, presentation, and justification of those decisions.

It seems clear that the two roles of a DSS in supporting the decision process are the addition of information to the process and the facilitation of the process. DSS support for unprogrammed decision-making is particularly interesting because it is specifically oriented toward psychological factors over technical factors. [16] The specific limitations of automation for supporting these sorts of decisions and the human factors involved in the decision process are as true today as they were at the time of this paper, and most of the literature relating to human cognitive error mechanisms is supportive of the conclusions and notions put forth in this paper.

4. Procedural Support

Every process has the potential for procedural support. To the extent that the procedure is structured, systematic execution of tracking of the procedure can be facilitated and thus systematized. Most facilitators, for example, have procedures that they use to facilitate processes that are defined. But this doesn't substitute for judgment. In highly structured DSSs procedures may be fully encoded in the DSS to the point where users simply follow step-by-step instructions to carry out their tasks.

5. Deception, Misuse, and Gaming of DSSs

All DSS approaches are susceptible to deception, misuse, and gaming, although some are more susceptible than others and in different ways. Deception can be considered in terms of the induction or suppression of signals [10] into the DSS. IF a user provides false data to the DSS, unless the system is designed with redundancy designed to detect such deceptions, the DSS will proceed under false assumptions and may help to support a poor decision. Most group processes, for example, can be subverted by malicious group members who might disrupt process at a gross level, or if they are more cleaver about it, may influence the group decision by the use of more subtle influence and negotiation tactics. [5][6]

It can be reasonably pointed out that attempts to influence outcomes of DSSs is the legitimate purview of those who use them and participate in their use. The purpose of a group decision process is, presumably, to allow the group to make "better" decisions, or alternatively, it may include persuading members of the group to buy into a decision, in which case the DSS is directed to support the decision rather than to support making the decision. If the goal is to make better decisions, the notion of what is "better" is nominal at best, unless specific decision criteria can be laid out, thus limiting the context of the DSS application. Group process again and again fails or gets led astray by group members who don't agree to or are not adequately notified in advance of the specific orientation and limitations of the process. In legitimate processes, group members may wish to push their points of view in order to generate support for their own agendas, and this sort of gaming of process leads to influence by those who are more skilled at gaming rather than a "better" decision against some other criteria.

6. Ranges of Values and Uncertainty

Many DSSs support measures of uncertainty in their data entry and analysis processes. Uncertainty seems, at first, to be problematic because, for decisions that are close calls, sensitivity to variations in parameters is high. A small change in an uncertain condition can lead to a high change in outcome when options are very close to equivalent. For situations in which a great deal of information is available to a high degree of accuracy and a small number of uncertainties remain, systematic analysis of variations in parameters is sensible. If the cost of additional analysis and precision is less than the consequences of the reduction in uncertainty resulting from the effort, the analysis is a profitable venture, however, there is also inherent uncertainty in the analysis of uncertainty in most cases. Except for the most structured decisions, analysis rapidly reaches a point of diminishing returns.

In most decision-making by people, the precise details of the probability distributions associated with factors under analysis are almost irrelevant. Most people make decisions between a small number of alternatives specifically chosen for their differences. If the decision is so close that a minor change in a probability distribution will sway it one way or another, the difference between the options is usually unimportant. As the number of options increase, this becomes even more problematic because, in a decision worth the effort of analysis, the number of factors increases at least linearly with the number of options, and as a result, the amount of uncertainty increases. For very long-term high-valued decisions that will not be adapted over time to meet changes in the environment, the analysis may be justified, but one is hard pressed to find such a decision. As decisions are being made, time is passing, and the default decisions of mot making a decision is being made every moment. Time is always a factor in decision-making and uncertainty about the future reduces with time, while the cost of changing a decision increases. The real value of understanding uncertainty is in being able to evaluate extremes of outcomes, and extremes are rarely ruled by minor variations in parameters.

A lot of probability theory has been applied to decision making but most real DSS systems used for strategic decisions are based on a sorting or other similar factor and option comparison method. This is because most such decisions do not surround continuously variable alternatives, but rather options that are fundamentally different. In essence they are architectural choices, not amplitude choices within an architecture.

Sorting strategies are commonly used in some DSS approaches, and these result in substantial flips between alternatives when two alternatives are close calls and could get sorted either way. Any uncertainty that could cause a flip in ordering when a sorting-based methodology is used represents a critical decision point and implies that such differences are very important. In reality, such close calls are rarely so critical that a minor variation in outcomes associated with one element or the other causes dramatic impacts on the quality of outcomes associated with the overall decision they factor into. Thus non-continuous methodologies such as sorting introduce high levels of unjustified outcome devision from small deviations in inherently uncertain input values. It is important that such methodologies be well understood and used only as appropriate in order to avoid large output errors being induced by small input errors.

7. Other Limits of Decision Methodologies

There are fundamental problems with all DSS methodologies. None of them can come up with new ideas beyond the scope of the knowledge and expertise of the contributors, and all of them induce a level of confidence in the results that may be unwarranted. Attempts to explore large decision spaces are context bounded and, while many group processes are based on the notion of getting proper quantities of properly diverse expertise [18], every such process misses things. The most thorough processes approaches are expensive and involve great deals of time and effort by serious minded experts, and they produce far better results than rapid processes, but they are also far more expensive and are typically only used in limited circumstances. And even these processes have all of the same failings of other human decision processes. All processes are subject to individual cognitive limits, group think for group processes, limits of imagination and unwillingness to listen to ideas that are outside of normal experience, and many other known error mechanisms. Even people knowledgeable about such error mechanisms cannot help the fact that they are human. Computers and other non-human mechanisms can reduce some of those errors, but this is usually at the cost of inducing other sorts of errors associated with the group processes necessary for their function. It is the nature about making decisions that they address future conditions and the future is not perfectly predictable by the past or by any known principles at a level of granularity necessary for meaningful use when encountering competitive environments such as those involving other people trying their best to defeat the DM's plans. Unlike the notions underlying game theory, in which there is, at least notionally, a concept of perfection or optimization, are worthwhile for exploring the issues, and operations research with its optimization algorithms apply to specific classes of engineering problems, the general decision making process associated with unstructured decisions remains largely a mystery and one that will not be soon solved. Many of these issues are detailed further in [19] and the references used therein.

Even with the summary of relevant research and findings given above, the problem remains for an interested reader how to incorporate all or a subset of these, or similar studies, into simulated or real-world applications. The present invention, in specific embodiments, involves crafting a rule-set and data analysis method for applying these studies to real world problems. This aspect of the invention can be embodied in one or more logic processes running on a computer system, or in a kit or set of graphical and textual materials that provide users with advice and other results based on inputs related to situations and factors.

Characteristics of the Invention

According to specific embodiments, the invention involves methods and/or systems for supporting "common decisions". In example implementations, the invention may be helpfully thought of as a tool designed to help reduce specific classes of cognitive errors commonly made by people in making certain types of decisions. In various embodiments, the invention is characterized by one or more of the following:

- It is oriented toward supporting subjective decisions and helping the user place them into an objective form without undue precision.
- It is oriented toward qualitative decisions, however, internally it uses quantitative values to perform calculations and provide outputs.
- It supports ordinal inputs to define user views and allows the user to then move those inputs around in a ratio space to define ordinal and interval values and provides normalization to support ratio outputs and comparisons across decisions.
- It uses a 3-level system consisting of decision groups, decisions, and factors, but can be readily extended to more levels. The user works in flat decision space on a single decision at a time.
- It supports simple decisions and uses normalization and cross-decision comparisons to support complex decisions.
- It is an explanatory system.
- It can be used for individual or group processes optionally with each user using a single user interface at any given time. It can and is intended to be used within an individual or collaboration environment and could be made or incorporated into a collaboration tool.
- It is a casual decision process system. With the use of libraries it can support more formal processes, but it does not constrain the user from proceeding as they wish. In other embodiments it can operate in formal decision environments.
- It is visualization-based in the sense that it uses visualization to support gaining clarity surrounding the relationships of factors.

It primarily supports strategic decisions, however it can be used for decisions at any level as long as they are within the time frames required for input, presentation, and analysis.

It uses an incremental model for adding and modifying factors relative to decisions.

It is user and model driven, however it can be augmented to use data driven, factor driven, or other models or incorporated within other models to provide added capabilities.

It uses the dimensions of importance and support or opposition to each simple decision. Other wordings are integrated into the displays, and other wordings or formulations of these concepts can be used, and the specific wordings selected are not intended to be limiting.

It operates at cognitive resonance speed or slower so that for normal human use in interactions it is fast enough to keep up without slowing the user's task performance. It has no slow speed limits so it can operate in any mode not requiring faster tempo than it can process.

It supports novice, expert, and professional DMs as well as groups but results will be better as the DM has more expertise or as it is used in the context of a process better structured for the decision being undertaken.

It is oriented toward architectural decisions rather than amplitude decisions in that it is not designed or intended to differentiate between minor variations inputs so as to make decisive selections between close alternatives or definitive determinations of ratios of effort.

In summary, the invention involves a high interaction rate, subjective, qualitative, flat, exploratory, casual, incremental, cognitive resonance speed and tempo, user-driven, visualization-based strategic DSS (subsystem) designed to help individuals or groups make simple architectural decisions surrounding ordinal factors placed in a ratio space consisting of importance and support.

The present invention will be further understood with reference to FIG. 1 and the other examples supplied herein and in the Appendix. It will be understood that these examples are not intended to illustrate every possible interface that may be desirable in a system according to specific embodiments of the invention, and that more generic and commonly understood interfaces, such as for file saving or report printing, are not shown. It will be further understood that not all details shown in any screen shot are necessary elements of all embodiments of the invention.

Figure 1B:
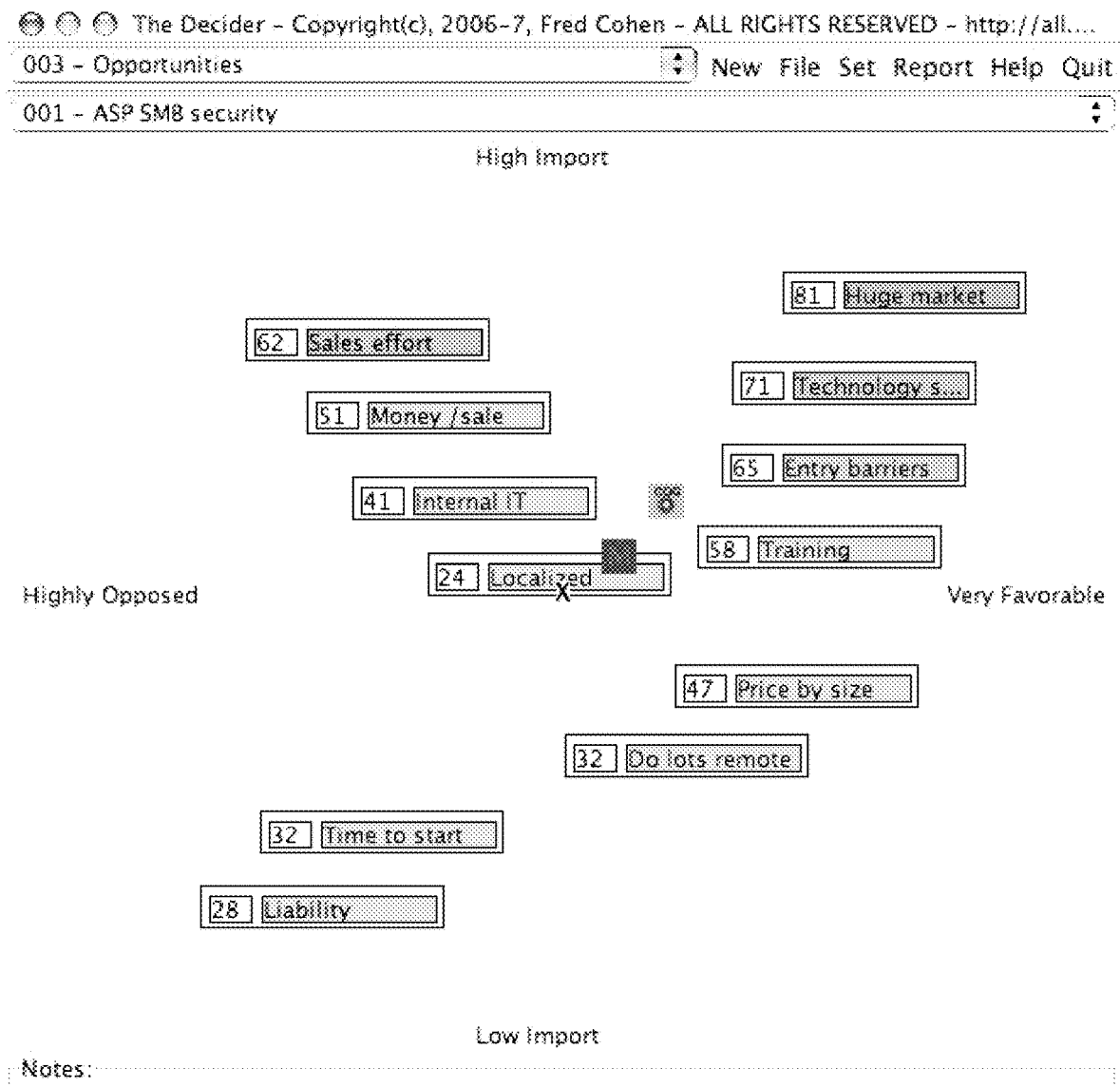
Figure 1C:
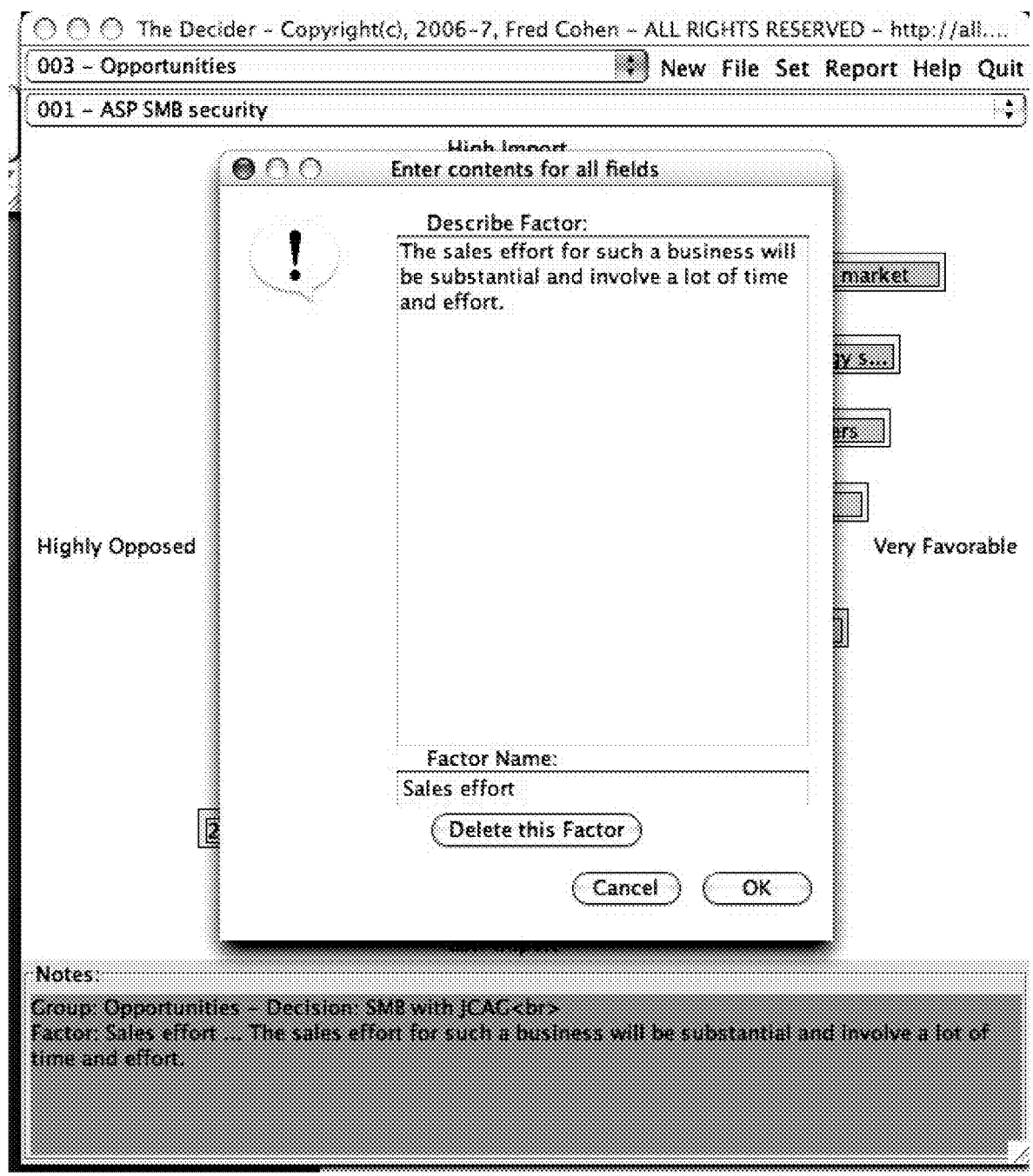

FIG. 1A-C illustrates screenshots of an example graphical interface with interactive factor objects and data input and advice presentation and data output fields allowing factor related data to be input and presented interactively according to specific embodiments of the present invention. Such a graphical interface, according to specific embodiments of the invention provides users an interactive and intuitive way to navigate through various data input tasks and options and view advice and strategies that are selected from possibly a large amount of stored data regarding influence methods. The juxtaposition of a graphical representation of factors and their relationships to a situation allows users to interpret input data and its effects on advice presented with some ease.

FIG. 1 shows the appearance of such a system in a typical DSS task. Menu-based controls allow the creation of new decision groups, decisions, and factors surrounding a decision; file-related operations like saving and deleting things, settings such as real-time normalization mode, report generation, documentation, and program exit. The current group and decision are identified in the menu bars at the top of the display and can be changed by selecting different items, resulting in an immediate change of the screen contents. The bottom area of the screen shows the last "touched" factor and includes the group name, the decision name and details, and the factor name and details.

In this example, factors are moved by grabbing the numerical tab with the mouse and dragging it to a new position in the {importance×favorability} space. Editing details is done by clicking on the text of the factor. The box labeled M (which can be in a characteristic color, such as blue) indicates a mean location and the box labeled COG represents a center of gravity. According to specific embodiments of the invention, these positions are updated in real-time as factors are moved around the space.

This particular illustrated decision surrounds the hiring of a firm for marketing assistance with regard to intellectual property. The features considered by the DM include (from most opposed to most favorable) the cost and business arrangement of the firm, the initial cost for what is being provided, the history of the supplier, their connections into the market, alternatives currently available, the responsiveness of the supplier, the extent to which their services are necessary, how hungry the supplier is for the business, the urgency of hiring them, and their relative size.

Clearly, this list is not the definitive list for all such efforts, and it is up to the DM to come up with a list of factors of import to the particular decision. A library might help to select off factors from a larger list developed by experts. This is a major shortfall of all systems not imbued with domain-specific content. For specific areas of expertise or for decisions previously made, initial libraries can be used, but no systematic approach to getting a definitive collection of considerations exists or is likely to appear in the future.

In this example, the location of the COG indicates a situation that is only slightly supportive in the aggregate toward this decision. The COG to the left of the mean and above it indicates that the more important factors are less favorable, again in the aggregate. The mean above the average importance indicates that this display is not normalized. The location of three of the four most important factors at the top of the importance scale indicates that this decision is not yet ready to be clearly made. By moving these elements right and left, it becomes immediately clear that this decision is highly sensitive to them, something obvious from their location almost alone in the top middle of the visualization. The magnitude of their effect can be seen by the user by dragging them around, and in this case it is quite clear that any one of them could sway the decision far into the favorable or unfavorable range. In the aggregate, they far outweigh the other decisions with "Connections" producing a maximum weight of 94, "History" of 89, and "Best option" of 84. Between them, the could concentrate a total weight of as much as 264 favorable or opposed, while the total weight of other considerations come to only 446. They can form up to ⅓ of the total weight of the decision.

Thus, the invention makes these conclusions obvious from the depiction of the situation with respect to this decision. The variation of parameters effort, for example, consisted of dragging each of the top middle factors to the left and right of the space and looking at the resulting numbers. Moving these factors up and down produces similar real-time effects, but in this case, it is not necessary to even do it because the co-location of the factors readily displays the effects of moving them up and down. If "Best option" is moved up, it will get to the values of "History?" and "Connections" and then above them if moved further.

Also apparent from the presentation provided by the invention is the fact that these criteria selection and absolute and relative placement in the space are subjective. Why is connections more important then the history of the firm when neither is known? It is a judgment of the DM that places them this way. How oppositional is the financial arrangement? It is a judgment of the DM. Would a different DM place them differently? Of course they might. In a different circumstance, would the weight of the factors be completely different? Of course they would. This is precisely why Decider and the DSS is useful. Because it brings clarity to the decision as it stands, including the criteria and ratings of criteria for the decision. It also allows them to be changed in an instant, and for different DMs in different situations, different decisions result. Issues of commensurability between disparate factors are readily resolved by the relative placement in this space, and the drudgery of pairwise comparisons and relative numerical weightings is tossed aside by the simple use of spatial placement. There is no false precision projected in such a system because it is clear from the outset that anyone can move these factors about as they desire. And if the decision is so close that a minor change will sway it, that is also clear.

The purpose of the present approach it to make decisions clear, both to those making them, and to those who review them. It is intentionally not constraining and is designed to operate quickly and simply with minimum effort and constraints. But this does not make it excessively casual. In fact, forcing the DM to put things in these terms tends to force them to think in these terms.

The present design is intended to support identifying attributes (or factors) of interest to each simple decision, weighing those factors relative to each other on the scales of importance and support or opposition to each decision, using the weights as a basis for asserting a decision, and explaining or justifying the decision. This constrains the DM in specific ways that tend to reduce certain types of errors that are common in decision making, particularly when there is little time and when decisions are of substantial, but not Earth shattering, importance. This is substantially accomplished by the use of visualization to engage the more parallel processing of the visual cortex as an aide to the internal pure factor activity that is more serial in nature and limited by focus of attention. By using visualization, focus of attention can more directly be pointed toward things or relative import, analysis proceeds using relative positions in space, thus engaging spatial reasoning, and the limits of memory are reduced in import because visualization continually projects all of the factors for nearly instant recall. Relatively little experience or training is required to learn what to look for in the space. Clusters of factors in different locations clearly indicate the situation and effects of variation in parameters. Decision aides, like the COG and color schemes provide clarity in terms of aggregate weights and in the social context of traffic signals and similar color schema.

In specific embodiments, various color indications or other patterns can be used to provide further visual display and/or feedback to a user. In one example, such as shown in FIG. 1, factors indicators change colors as they are moved within the decision space, with factors at the favorable side (e.g., right) and top being green, and the factors changing shades to yellow and red as they are moved to the unfavorable (e.g., left) side. Optionally, factors may have a shade or intensity change as they are moved down the importance axis.

Thus, according to specific embodiments, as illustrated in FIG. 1, the invention involves a method and/or modules that accept input from and/or produce output to a graphical user interface which depicts factors as located in a two dimensional space indicative of their support and interest in the issue at hand at the time of interest.

Data entry in this embodiment indicates identifying name, and detailed description of thoughts surrounding each factor or individual or group (represented by the named boxes) which is combined with the location in the space to provide a variety of indicators of the situation at present and how those factors weigh into the present option or decision. Output consisting of colors, numbers, listings of factors in different sorts, analytical results based on shapes of collections of factors, and other relevant information are provided and updated as the user alters information about the factors or moves that factor around the screen to indicate a different location in the two dimensions identified.

One example method that can be used in this embodiment includes the use of a series of indicators that identify options that are available for presentation of each decision in terms of ordering of factors to favor, oppose, or view the factors as a neutral observer might.

As an example, based on the relative importance and favorability given by the positioning of the factor, the order of presentation is provided in a sorting that puts the most favored points first, followed by neutral factors and oppositional factors, followed by a repetition of the positive factors. This list is then provided as a presentation approach in the reporting mechanism. This follows the ordering results given by Karrass.

8. Matrix Display

Another example is a different presentation in which factors are placed in a three by three matrix with importance represented by the vertical and favorability by the horizontal axis. Within each region, based on the user positioning of factors, the factors are sorted by overall ranking and placed within the matrix. A similar matrix is also formed containing only counts of the numbers of factors in each area and shading to indicate relative density of factors in each area. This depiction is then matched against pre-defined analysis of those pictures to provide results as to the risk level, definitiveness, favorability, and dominance of the decision.

In this example, the analysis of these factors follows the analysis provided above, and provides reports that allow these features of the arrangements of factors to be presented to the user in order to help them better clarify their decision.

Other related research and expert opinions are also used to impact the advice provided. For example, if the sort of decision being made has historically been based on a set of factors in common use, if the organization has more formalized methods used in making these sorts of decisions, or if libraries of factors identified and used by others are adopted, the factors used by others, optionally including their weightings, can be used as a starting point for analysis of a particular decision or option.

The example embodiment illustrated in FIG. 1 allows the user to select from stored libraries or previously performed decisions to for the basis for evaluation of the present decision or option.

This example embodiment also provides scoring information on how much overall effect movement of this factor through the space will have on the overall metric provided for assessing the current status of the decision or option. This is done by rating the locations of the factors in the space and giving each factor a weight associated with its position. Higher importance and more extremes of favorability or opposition are given higher ratings. The combined weights are then normalized relative a maximum value to give a measurement of the relative weight of the individual factors on the overall decision or option. Analysis of differences for movements in different directions and movements of different factors are then used to understand the implications of variations in parameters. This particular embodiment also provides comment information putting this data into linguistic terms and rolls up the individual weights of factors to present the average weight in each of the two dimensions and a weighted center of gravity (the COG) for all factors on the display.

This embodiment further optionally provides for a file name that is used to store and subsequently retrieve the current situation for future use and the capacity to store, retrieve, and analyze, and present results for an unlimited number of these situations.

This particular embodiment also provides a capacity to alter values and locations of individuals and groups through the user interface, and to create or delete individuals, decisions, and groups of decisions for analysis.

This particular embodiment also provides output in written form that consolidates all actions advices for all factors and across groups and sorts those results in various different ways for different presentations and analytical uses.

The present invention can be implemented as a computer program running on an information appliance, such as a computer, or on several computers using a network. The invention may also be embodied in other forms such as a board game using tables and charts to judge player moves and dice or similar random selection methods to cause results of efforts to be generated for the situation. In one embodiment, a network may include connections via the Internet, a Local Area Network, subscriber networks, etc. Among other possible user interfaces, the invention may be embodied in a system of GUIs. General methods for construction and operation of such systems are well known in the art, and the present invention can be understood as operating in a way roughly similar to other systems used in similar environments, except as specified herein.

A specific example embodiment is presented in the Source Code Appendix, which presents a logic module system, written in Java, for creating the interactive graphical display as shown in FIG. 1, for evaluating inputs, and for providing advice and other options and functionality as described herein.

The present invention can also be implemented using a series of charts, tables, cards, etc., that systematize a set of rules related to influence and provide advice and/or scoring related to strategies for one or more users. Such an implementation may be particularly suited to embodiments in various strategy games for educational or entertainment.

9. Cognitive Error Mitigation

The present invention is specifically intended to help mitigate or at least clarify the sources of specific and common cognitive errors in the decision process. In the context of an individual DM, they are, roughly:

Errors as to when is the decision ready to be made or announced: Because decisions that involve a lot of uncertainty or high import non-aligned elements are clearly visible, the lack of resolution of these issues is clearly identified to help prevent premature decision making or announcement.

Errors from memory limitations of mental or list-oriented decision-making: The use of visual modeling reduces memory limitations and allows focus of attention to be directed by visual processing. The 7+−3 memory limitation identified in early research is an example of a limitation that can be readily overcome by visualization. It is easy to rapidly comprehend and put into context 15 to 25 factors regarding a decision using visualization, and placement is both very fast and readily compared to surrounding factors for quick judgments that tend to remain fairly stable over time unless informed by new information.

Errors induced by ordering of presentation and analysis of decision factors: Ordering of presentation is used in influence strategies to cause cognitive errors in the listener by focusing their attention and limiting their ability to remember positions counter to the presenter's viewpoint. Visualization eliminates the memory limitations associated with ordering and allows consideration to be made of all identified factors in orders and with priorities set by the DM. Decider also provides reporting designed to help present a neutral, favorable, or unfavorable presentations of the decision as an aide to justification and analysis of presentations of others.

Group think errors: Certain aspects of group think errors are related to the introduction and rapid elimination of ideas that are beneficial to better outcomes. Dismissal in group think situations often leads to loss of the idea, whereas with a real-time tool that allows all ideas to be rapidly placed in the visual area, retains the idea, even if it is given a low import value in initial placement. As decisions are explored over time, ideas that were once considered of low import are often elevated through the process, and the ability to easily manipulate positioning and codify details surrounding each factor helps to reduce group think errors of this sort.

Errors of commensurability: Commensurable ideas are often put into a financial or other common context as a basis for comparison, using the commensurable dimensions as the sole basis for comparison. Decider uses the generic notion of favorability that allows otherwise incommensurable factors to be mad commensurate in a generic manner. Rather than forcing a viewpoint, the generic dimensions of importance and favorability appear to provide a venue in which any rational can be reasonably placed with the details of why the placement is done at the discretion of the DM and documented at their sole discretion.

Tendency toward oversimplification: Oversimplification is often the result of an inability to place large numbers of considerations into context and to consider them relative to each other. By decreasing cognitive load, cognitive overload associated with keeping large numbers of factors in short-term memory is reduced or eliminated, while still retaining the utility of the content being held, by placement in the decision space rather than in the mind of the DM. There is no need to oversimplify if the added complexity does not increase cognitive workload.

A desire not to think, and strong desire not to rethink: The desire not to think remains, of course, but the difficulty of tool usage and cognitive load of complex decision-making without tools often drives DMs to reduce the amount of effort by reducing the factors considered and the time spent considering them. By placing low load on the use of a tool (i.e., by taking as little information in as possible and allowing detailing at the discretion of the DM and in their time frame), the DM can focus on introducing and placing factors in context and resolving conflicted factors. Once the factors are present and placed and conflicts are resolved, the DM can provide additional explanation if desired to help explain the decision. Also, the movement away from input of numbers and toward the placement in space reduces the difficulty of codifying numerical values and comparing them mentally. Decisions can also be revisited after substantial delays and rapidly put back into context, thus reducing rethink issues and the time involved in returning to context by human DMs. Unresolved high import issues pop right out, can be resolved, and the decision can proceed without detailed reexamination.

Commitment and consistency errors: The tendency to meet commitments given and supported with actions is as often the result of making commitments prematurely or in excess of reasoned levels as it is of the carrying out of those actions. While many such errors may remain, the presence of multiple factors in confluence allows the DM to see clearly the level of commitment associated with individual factors within a decision. For example, when a sales person generates agreements on small things one after another, those may be viewed as supportive, but because of their low relative import, when placed in proper context, they remain only proportionately consequential to the overall decision. The marketing assistance example provided above has four relatively low import positive features (Responsive, Hungry?, Small, and Urgency), and when used to show commitment and consistency, they would normally appear to make a strong case in support of buying into the decision. But when weighed in context and presented spatially, they clearly have relatively little impact on the overall decision.

Liking and related influence factors: Likability of the presenter is a major factor in making agreements, particularly when all other things are equal or nearly equal. There is nothing inappropriate about this, and indeed relationships are often key to success of efforts. However, likability, as all other factors, should be put in perspective by the DM. By identifying it as a factor relative to the decision, it can be placed in context and evaluated with proper weight.

Of course the potential for reduction in these classes of errors is not a panacea. There are plenty of other error types that this approach does not address.

10. Ranges of Values and Uncertainty

In the present system, all values associated with factors are fixed values located at a single point in the metric space, which has more digits of accuracy than the input can sustain, and can therefore be treated as continuous as long as calculation errors don't combine to approach input accuracy. The underlying structure currently uses values ranged from 0 to 10,000, which means that there are 5 digits of accuracy in calculation and storage. Actual screen positioning on the largest screens in widespread use can get no better than a few thousand points in any one direction, and human processes cannot realistically be expected to use anything like this level of accuracy in evaluating importance or support levels for factors in a non-structured decision.

Figure 2:
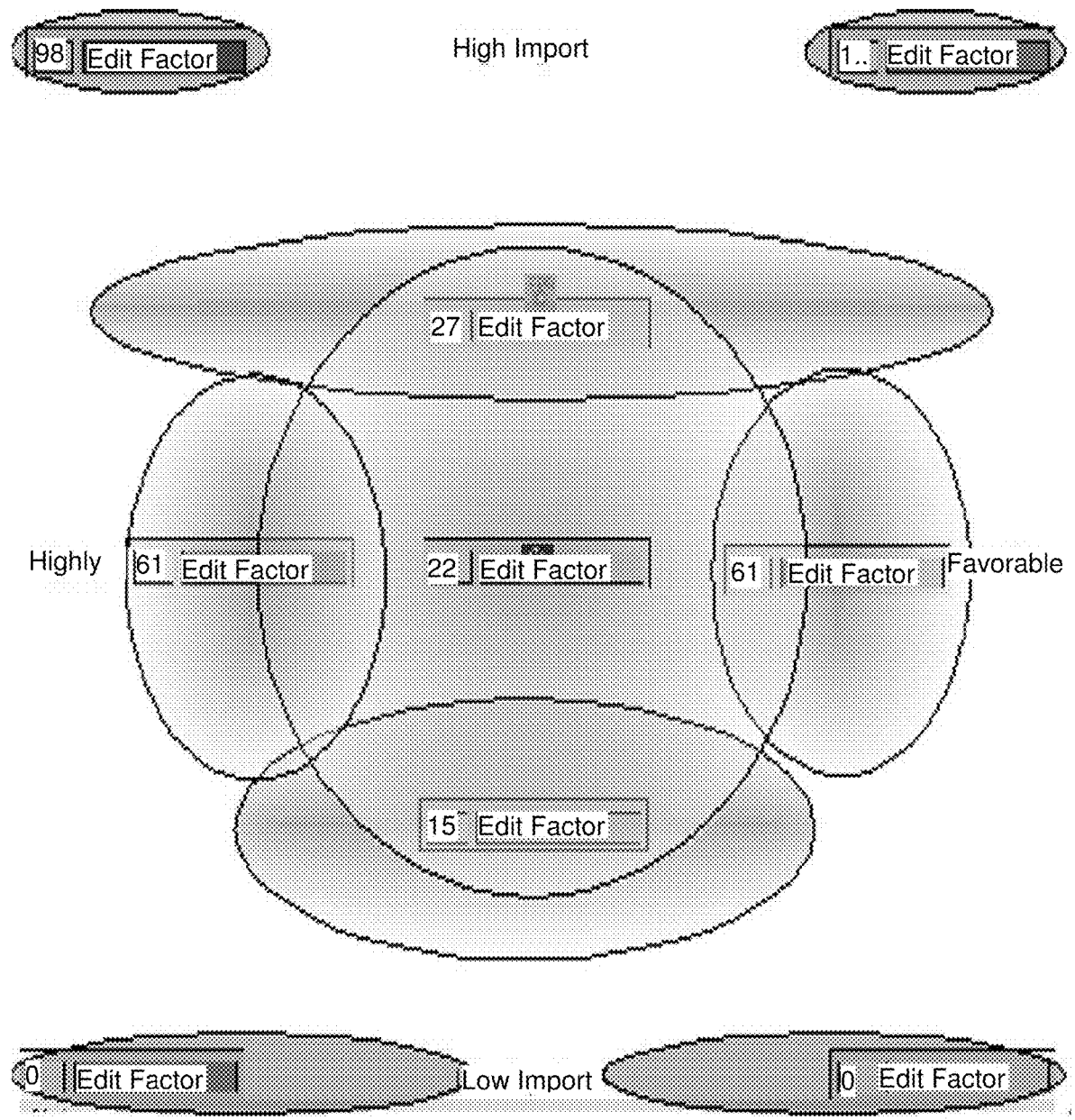
FIG. 2 shows notional probability distributions surrounding different positions of factors in the display.

At first it may seem problematic to use point approximations to relatively uncertain distributions of values. But arguably, the increased complexity of entry and difficulty in justifying the creation of distribution areas with DM-defined shapes surrounding locations of factors in a two dimensional space of this sort is not worth any reasonable utility it could bring. Rather, an implicit assumption about the meaning of placement seems justified. The assumption is that, near the extremes of importance and support or opposition, the variances are small, while nearer to middle of the range, the variances are larger. That is, if a DM places a factor at high importance and high support (the upper right hand corner of the display area), the intent is to indicate that they are certain that it is very important and very supportive. But when a DM places a factor at high importance and in the middle range between supportive and oppositional, it means that either the factor is not as important as they assess it is, that it is actually a complex factor consisting of many less important factors that vary across the range of support, or that there is a high degree of uncertainty about the level of support the factor provides to weighing in favor of or against the decision. There is usually less certainty for less important factors because of the reduced need and effort associated with clarification. FIG. 2 shows notional probability distributions surrounding different positions of factors in the display.

To resolve uncertainties inherent in positioning, the DM can either decide to partition a factor in to a set of factors that each have less importance and less variation in favorability and place them further from the center, or leave them where they are and recognize that they represent uncertainty. But regardless of the approach taken, the results will not suffer from the issues of sorting discontinuity or dramatic changes in outcome with minor variances in placement because the space is, to a high enough degree of accuracy, continuous in both dimensions. Minor input placement changes result in minor output changes for the COG, mean, and appearance.

11. The Meaning of Shape

With the notions surrounding probability distribution firmly in place, the meaning of overall shapes can start to be posited. The overall shape of a decision can be considered in terms of the collection of positioned factors on the overall screen.

TABLE 1

| | Locations in the space | | |
| --- | --- | --- | --- |
| | High opposition | Neutral | High support |
| Very important | High certainty | Low certainty | High certainty |
| Important | Med certainty | Lower certainty | Med certainty |
| Less important | Low effort | Minimal effort | Low effort |

While all possible shapes cannot be considered in finite space, there are some recurring themes that can be used to categorize common shapes and associate them with useful interpretation for the DM. In particular, it is useful to partition the space onto 9 regions as shown in table form here. As more factors appear in different areas of the screen, shapes emerge in the sense of clusters of factors. These shapes can be thought of in terms of a tic-tac-toe board. There are a total of 9 squares and, if we reduce the analysis to presence or absence in relatively meaningful quantity, the total number of configurations of the matrix is presence or absence in each of 9 squares, or $2^9$ (512) different configurations. If we allow more than two states per location, the number increases as $N^9$ with N as the number of states per location. Rather than try to characterize all of these states, some of the more obvious ones come immediately to mind.

FIG. 3 illustrates a shape table that identifies different situations (S) and interpretations of those situations in light of the locations in the space of heavily favored factors according to specific embodiments of the invention. The other configurations all involve variations on this theme. Indeed the case identified above where normalization is helpful is intended to help the DM decide what is more important and upgrade their relative import. However, in complex decisions and group decisions, the use of normalization will invalidate cross-decision comparisons and should not be undertaken prematurely.

12. Alignment or Conflicts of Views or Interests

As a further embodiment, a system of the invention can provide for alignment or conflicts of views or interests. For clarification, an example of this would be having each of a group of candidates for a political office characterized (one factor per each identified position of a candidate) in terms of their positions on each of a number of issues (one or more decision per issue), and having an individual place their factor within each decisions space, calculating the distances between individuals and each of the candidates, and producing outputs indicating which candidates most closely align with each voter on each issue and which aligns most closely in the aggregate, taking into account both the support (or opposition) and the importance to the candidate and the voter. This could be done, for example, to allow voters to independently compare their views to the views of candidates, and in a combined way to have lots of voter views aligned with lots of candidates, etc.

According to specific embodiments of the invention, this may be implemented by: placing one or more factors associated with different individuals placed within the decision space for each of one or more decisions; calculating values associated with the differences in locations within the space to one or more pairs of said factors Producing output indicative of the differences in locations; and optionally calculating combined values associated with the combined values associated with a plurality of said differences in said locations.

13. Complex Decisions and Decision Groups

Complex decisions are decisions in which more than two options (more than a yes/no decision) exist. While a simple yes/no decision, a zero-sum decision in which one option is favored when the other is not, can be readily modeled by the two dimensions of importance and favorability, more complex decisions with intertwined components appear to be more difficult to model. As it turns out, the vast majority of the literature surrounding complex decisions is based on the notion that each option should be analyzed on its own and weighted relative to the alternatives. There is no real difference between this approach and the assumption that options are independent of each other, evaluating each on its own, and then treating each and its COG as competitors on the import and favorability scale, and subject to issues like the level of resolution and risk factors, as described above for different situations.

Complex decisions involving multiple more or less independent decisions or decisions which can be evaluated on their own based on factors that may or may not be shared and/or independent of each other, can be modeled as a set of independent decisions which are then reconciles on demand. This approach to modeling starts with independent evaluation of independent decisions.

Complex Decision Example

As an example, suppose we have 12 alternative building designs for a new museum. This is a fairly high valued decision, it cannot really be reversed once made, and it has impacts for at least 50 years. The decision is usually made over a period of months and involves many committees. However, for now, we will assume that the responsibility lies on a single DM who will communicate with all of the others in whatever way they wish to generate information. One approach is to start by gathering decision criteria, the part of the process sometimes called factor generation. A common set of factors can be used for evaluation, and this often brings a sense of "fairness" to the process, however, it is also problematic because the definition of the factors and their weighting is the real battle for winning the contract. Each designer will, presumably, try to get their best features defined as factors in the decision. Alternatively, the designers will seek out the factors in advance and it will bias either their designs, their presentations, or both. For now, we will assume that a common set of factors is defined for the effort but that additional factors can be added by the DM as they see fit to reflect special features they associated with different designs. We will imagine that the commonly defined factors include cost, build time, beauty, size and site requirements, style, and reputation of the architect. In addition, for each specific design, other factors will be added as the DM sees fit, and factors will be weighted by the DM as they see fit based on submissions.

To set up such a decision, a decision group is formed and it is initially populated with a single decision names "Factors" with each factor identified by name and details of the evaluation criteria specified in a comment area. This take less than a minute to do. If the DM is to make all weighting decisions, all of the factors are initially placed at the bottom of the screen, with importance of zero, and thus none effect the COG at all. An alternative view would be to set the importance of these factors in advance and allow the DM to determine the extent to which they are favorable or opposed. This is done by placing the factors in the middle of the favorability dimension and at the proper height for relative import in the importance dimension. The former approach minimizes the effect of biases from the original factor design while the latter eliminates the favorability dimension only.

This general approach is essentially the use of libraries. For any class of decisions, a library generally can be created to include the most relevant factors considered by others historically, and the library can then be used repeatedly. However, the use of such a library also biases the outcomes. This sort of bias is often done intentionally to meet the standards of an enterprise. For example, many companies have standards for internal funding requests. If you don't meet the standards, you cannot get funded regardless of how good your idea is. Thus the decision process is dogmatic to the extent that it must consider specific factors. In such cases, only the evaluation of weights for importance and favorability are applied and the outcomes then considered.

Linking Factors in Group Decisions

In further embodiments, a system according to the invention can provide one or more option inputs as would be understood in the art that would allow a user to specify that one or more factors should be associated across groups so that changes in one or more factors associated with one decision in a group are reflected in related changes to other factors within that same group. Generally, this will be a one-to-one relationship between factors, though more complicated relationships, such as inverse relationships or proportional relationships can be allowed.

According to specific embodiments of the invention, one or more types of factor characteristics may be linked, including but not limited to: changes in importance of the same factor in two decisions being linked to each other so that their importance remains identical even though their favorability differs, changes in favorability of the same factor in two decisions being linked to each other so that their favorability remains identical even though their importance differs, changes in names of factors linked to each other so that a name change of a factor in one decision is reflected in other decisions within the same group, and changes in the locks on decisions within groups so that when one lock changes other locks also change.

Various techniques for setting property options to objects in a logic processing environment are known and can be used to implement these aspects of the invention.

What really happens in many such cases [16] is that DMs make a choice at some point and then seek to justify it, or make the choice prior to the start of the purported decision process and acquire evidence to support their decision. The latter process normally consists of creating a specification for the decision that favors one of the options and then doing ratings that prove the rationality of the decision. The former process may start with a fair-minded approach, but at some point, the DM finds that one of the options is appealing for whatever reason and then seeks to generate enough additional data to justify the selection prior to announcement of the decision. Unless the desired decision is completely dominated by another option, there is always a weighting that will generate the proper outcome, and even if there is no such weighting, the inputs can be altered, positions stated with increased or decreased strength, or in the worst case, the contract can be rebid or restructured.

Figure 4:
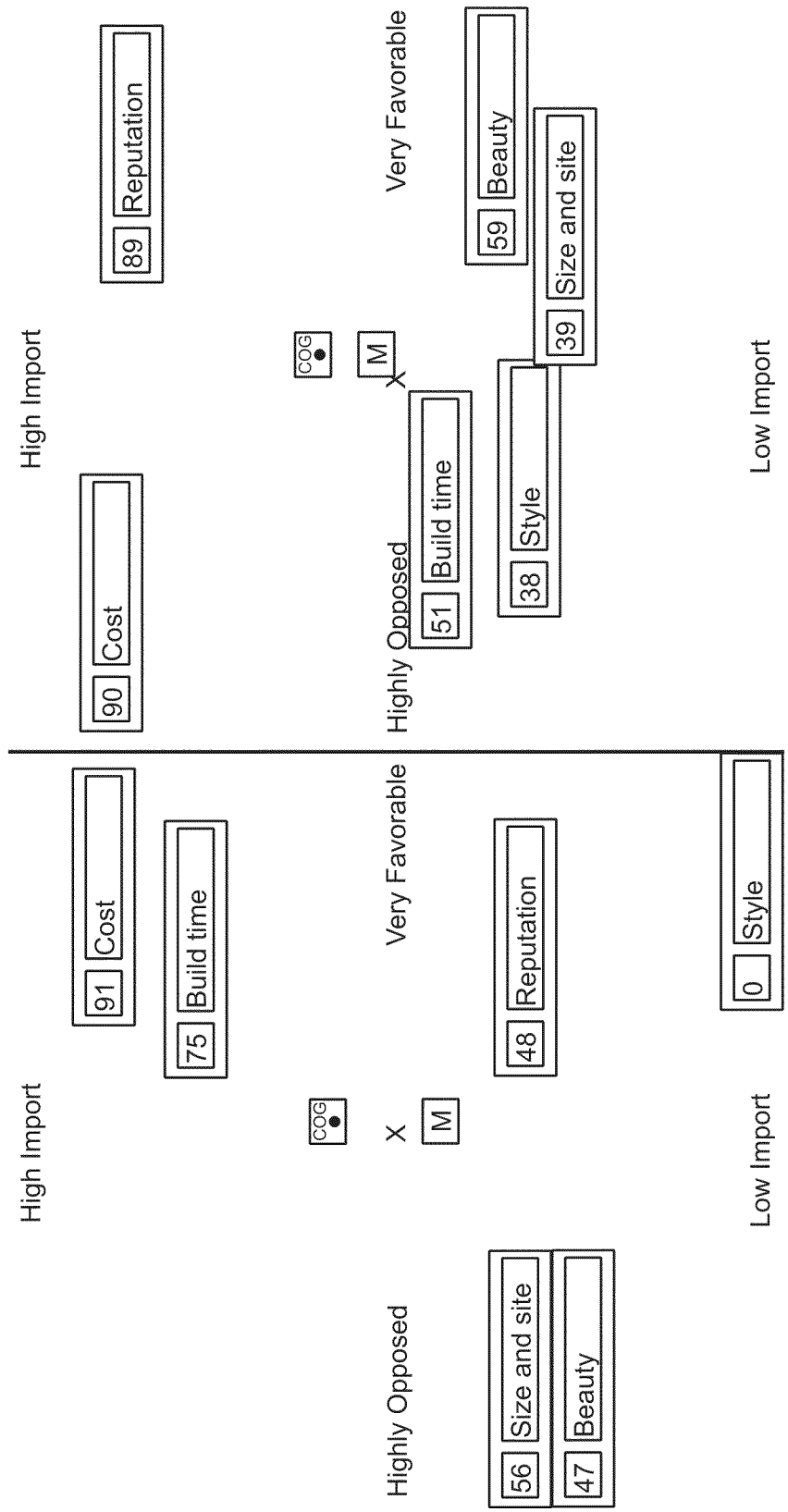
FIG. 4 illustrates an example of two different pictures associated with two different but nearly equally weighted outcomes.

Tool usage in deciding between options is generally in the form of creating rankings or weighted rankings based on sets of favorability criteria. Hierarchical tools evaluate factors one after another, multiplying by weights and producing a single aggregate weight for each option. The options are then presented in terms of those weightings. Tree graphs produce the weightings and all of the drill-down up to a substantial number of options on a single screen, and this is increasingly used by DMs who appreciate the roll-up as well as the detailed break-down that tree maps afford. But tree maps do not present the sort of shape-related data that the present approach provides. FIG. 4 illustrates an example of two different pictures associated with two different but nearly equally weighted outcomes.

This example shows immediately that the option on the left is highly favorable, while the one on the right is very risky, even though their centers of gravity and means are nearly identical. Similar circumstances can be generated for cases where ordering and values in importance are identical for cases where such values are preset. In a tree graph, the weights come out nearly identical with different lower-level boxes comprising different portions of the space, but without the relative orientation in the import and favorability dimensions, the favored choice remains unclear. For larger numbers of options, this approach becomes rapidly untenable because the human visual system does not make useful sense of these displays and nothing new ends up being obvious or clear.

Several alternative approaches have been examined, including displaying multiple simple decisions together with different color schemes, comparing only the COGs on a single display, making shapes to depict the situations, and doing automated analysis and presentations:

A Display With Details of Decisions in Context

Figure 5:
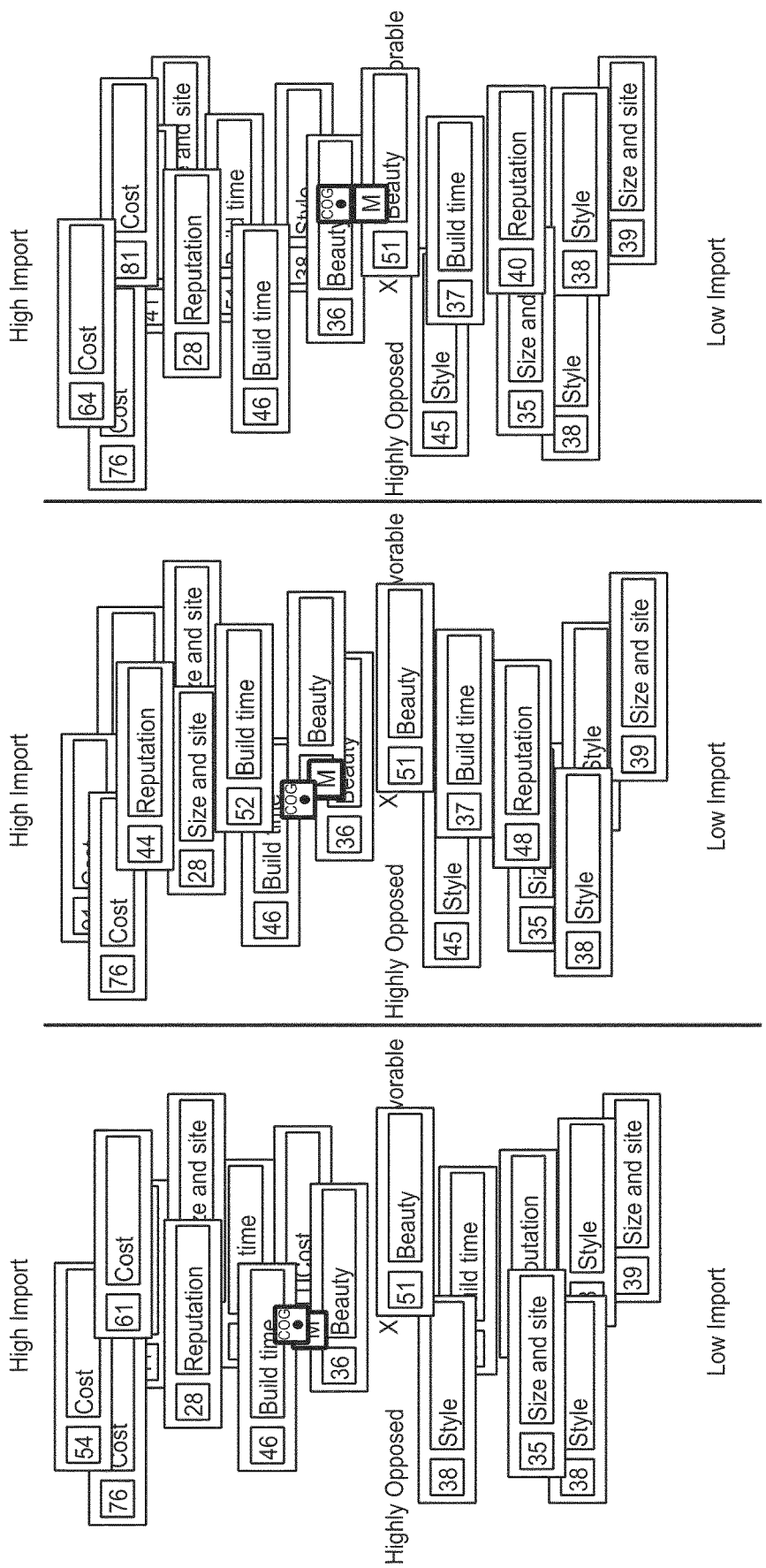
FIG. 5 illustrates an example of three decision areas displayed side by side according to specific embodiments of the invention.

Placing all elements of a set of simple decisions together on the screen and allowing focus on one at a time or other similar schemes have produced hard-to-comprehend visualizations that are not very useful, even in situations where one user is able to flip between displays quickly or display them side by side. The clutter produced with even a small number of simple decisions comprised of a small number of identical factors is problematic. Using a single color for each option does not help the situation and a very similar confusing outcome results. FIG. 5 illustrates an example of three decision areas displayed side by side according to specific embodiments of the invention.

FIG. 6 illustrates multiple options next to each other by only displaying the COGs of each according to specific embodiments of the invention. Multiple options can be shown next to each other by only displaying the COGs of each, and if desired, the makeup of each can be added to the display upon selection of its COG. This produces a direct side-by-side comparison, but only of the single aggregate result. Some sense of deviations and sensitivity is helpful in order to gain clarity around such displays, however, these too produce challenges for more than the most obvious situations with small numbers of options. In this example, we have plotted the three COGs together on a single display. They are, respectively at locations 48×40, 51×40, 65×43. While this display certainly seems to show that the third option (64×43) is superior, it tells the viewer nothing about risk levels, which might be problematic depending on the risk tolerance of the DM, nothing about which factors reside where, and if it weren't for the fact that the third entry is above and to the right of the others, the decision would not be clear in any sense. In the picture, the farthest right square (e.g., blue) appears to be the best option from among the choices, however, no additional information is provided for the purposes of comparison.

14. Tic-Tac-Toe Style Displays

FIG. 7 illustrates a tic-tac-toe style for analysis of overall shapes according to specific embodiments of the invention. A presentation with these shapes, again for the same data, provides more clarity in that it, essentially, asserts that (in this case) the Mercury option is clearly better and supports that contention with substantial data in a small space. Using the tic-tac-toe approach in combination with the figures above yields more information more clearly than the other alternatives examined. In specific embodiments, it can combine the color notions mentioned above with enough text to be useful and allows direct comparison to the tic-tac-toe panels.

According to further specific embodiments of the invention, the tic-tac-toe representation can be simplified into white (for no entries), gray (for one entry), and black (for more than one entry), as shown above. Within each area (at right), each factor is sorted from highest to lowest impact on the COG and the COG and Mean are included in their relative positions. All options have risks, but clearly, the third option leans further toward support for the effort. The third option is more clarified than the other two as it has most of its factors out of the neutral area and nothing in the high importance and neutral favorability area. The COG is unfavorable for the first option, neutral for the second option, and favorable for the third option, however, the COG and Mean are both in the middle square for all three options, so there is nothing dramatically beneficial about one over the other. Automated analysis of the different situations can include a variety of other methods, including relative quantity of factors in different locations, the use of less important factors in proportion when too few high importance factors are present, and special cases for extremes. Of the alternatives examined, this display appears to be the most useful in terms of combining rapid cognitive utility, simple drill-down at a glance, and the ability to perform meaningful situation analysis without additional detail. Actual analytical results are shown in Table 2.

TABLE 2

| | | | | | |
|---|---|---|---|---|---|
| 44 | Opt 3 | 1 0 1 | 0 1 2 | 0 0 1 | Important favorable and unfavorable factors - the decision is high risk. (Risk: high, Dominance: no, Answer: unknown, Decided: no) |
| 27 | Opt 2 | 0 1 1 | 1 3 0 | 0 0 0 | Favorable but not fully decided; resolve important unclear factors before decision. (Risk: moderate, Dominance: no, Answer: favorable, Decided: unclear) |
| 25 | Opt 1 | 1 1 1 | 0 0 1 | 1 0 1 | Important unfavorable, neutral, and favorable factors! Clarify the neutral factors before making the decision. (Risk: high, Dominance: no, Answer: unclear, Decided: no) |

This particular example is sorted by COG and identifies specific characteristics along with the names and shapes in the tic-tac-toe representation. Not all cases are this simple, but all can be reduced to very similar sorts of options with identified features of the shapes. The risk averse individual may follow the advice, find that option 2 is of minimum risk, even if not highly favored, and proceed. A risk taker might see option 1 as the clear winner, and many DMs might determine that they can overcome the important unfavorable element by changes and favor this option. It is, in the view presented in this paper, not the job of automation or decision support systems to force a selection, but rather to clarify the selection and let the DM make their decision.

For cases in which a relatively small portion of factors are in the high importance areas, the analysis process can use medium importance factors at reduced weights. The same analysis is then carried out. Table 3 illustrates is an example of the results of such an analysis on a test case.

TABLE 3

MUSEUM DECISIONS SORTED WITH SHAPES

| 37 One High | 1 1 0 | 0 2 0 | 0 3 0 | High importance factors less than ⅔th of total space - augmenting with medium importance factors/2. Important favorable, unfavorable, and neutral! Clarify the neutral before making the decision. (Risk: high, Dominance: no, Answer: unclear, Decided: no) |
|---|---|---|---|---|

This approach works reasonably well for substantial numbers of options or with many factors. As the number of options increases, additional assistance in the review process becomes helpful. The analysis of risk, decision readiness, and clarity is a significant augmentation and often clarifies the results to the point where down-selection to a smaller number of options is made. This is a common process used by people in complex decision-making processes. Without this sort of separation, the next best methodology identified is further improvement of visualization. This is where sorting helps.

Sorting from best to worst on any dimension of dominance will always put dominant strategies above dominated ones, and if sorting is done across all dimensions, strictly dominant strategies will always be first to appear because they will come to the top in every sort. In this sense, dominance is a form of sorting. However, sorting in only partially dominant strategies will prioritize one sort of dominance over another. In this sense, sorting is problematic in that it may produce misleading results when used to compare decision options. For example, in the museum case, sorting by cost as the highest priority (and thus the last sort process undertaken) would yield the $1^{st}$ option on the top of the list, while sorting by build time would lead with the $2^{nd}$ option, and sorting by size and site puts the $3^{rd}$ option at the top. Sorting by the COG makes more sense in the mathematical structure provided, as it compensates for the differences in the weights of factors. This approach yields the $3^{rd}$ option followed by the $2^{nd}$ option followed by the $1^{st}$ option, which matches the sense that is obvious from the plotting of the COGs above.

Game theory is designed to address similar situations, including situations with mixed strategies and may be applicable in the case of multiple options, particularly when more than one option can be simultaneously exercised in differing quantities. If characterized as a game, decisions of the sorts discussed here are memoryless (non-repeated) non-zero sum games with incomplete information from the standpoint of the DM. If each option is independent and only one can be exercised at a time, then from each option's point of view, they are playing a multi-player zero-sum game (what they lose some alternative wins) with uncertain information. It is also to be expected that, in cases such as the museum situation, the bidders for the contract will be gaming the situation or using some similar approach to try to optimize their likelihood of being selected. As such, it is incumbent on the DM to realize that they are being gamed and to take this into consideration in their analysis.

There are serious problems with applying game theory or other similar optimization approaches to this sort of decision. Among the obvious problems are (1) the fact that most game theoretic or optimization-based solutions are highly sensitive to minor variations in parameters, and therefore require precise values that are not available in this sort of analysis; and (2) the lack of a common game theoretic approach to the entire class of decisions supported by this approach. In fact, game theory is not really designed for this class of problem, nor is any other common mathematical approach. Approaches available in the literature requires more structure than is normally available without more structured decision processes and increase quantities of data. They also make assumptions that are almost always invalid for the sorts of circumstances identified here.

15. Presentation Orderings

Another key output that can be readily produced from the data available in this class of DSSs is based on a different sorting approach. According to Karrass [5], the order of presentation has a substantial effect on cognition and outcomes of presentations of material. The has been confirmed by many other authors in more specific circumstances. By presentation ordering, persuasive outlines of presentations can be readily created to support, oppose, or treat neutrally the presentation of factors regarding a decision, and the resulting decision. This goes to supporting the justification of the decision ultimately supported by the DSS. The three orderings of decisions go, roughly, as follows:

To support the decision: Present the supportive factors first, from most favorable to least, then the oppositional factors, from least to most, then the neutral factors from most important to least, then represent the top several supportive factors and draw the supportive conclusion.

To oppose the decision: Present the opposing factors first, from most important to least, followed by the supportive factors, from least important to most, followed by the neutral factors, from most important to least, followed by the top several opposed factors, and draw the oppositional conclusion.

To provide a neutral viewpoint: Present the neutral factors first, from most important to least, alternating where possible between slightly favorable and slightly oppositional, followed by alternating favorable and oppositional factors from most important to least, followed by the top several neutral factors, and conclude that no definitive decision can be made based on the available information or ask the recipient to make up their own mind.

Table 4A-C illustrates the three different presentations based on these three sorts for the Museum example. To most readers, these three presentations are viewed quite differently, and if augmented with word styles and proper presentation, they can each be persuasive toward their position.

TABLE 4A

FAVORABLE PRESENTATION

| | | |
|---|---|---|
| Item 4 | Build time | The building will be available for us early. |
| Item 3 | Beauty | The building meets the standards of beauty that committee members and board members expect of a new project of this magnitude. |
| Item 2 | Size and site | The design exceeds the size and site requirements in beneficial ways. |
| Item 0 | Cost | The cost is higher than anticipated |
| Item 1 | Style | The building style is not well matched to the liking of the donors. |
| Item 5 | Reputation | Reputation of the architect is acceptable. |
| Item 4 | Build time | The building will be available for us early. |

TABLE 4B

OPPOSITIONAL PRESENTATION

| | | |
|---|---|---|
| Item 0 | Cost | The cost is higher than anticipated |
| Item 1 | Style | The building style is not well matched to the liking of the donors. |
| Item 5 | Reputation | Reputation of the architect is acceptable. |
| Item 4 | Build time | The building will be available for us early. |
| Item 3 | Beauty | The building meets the standards of beauty that committee members and board members expect of a new project of this magnitude. |
| Item 2 | Size and site | The design exceeds the size and site requirements in beneficial ways. |
| Item 0 | Cost | The cost is higher than anticipated |

TABLE 4C

NEUTRAL PRESENTATION

| | | |
|---|---|---|
| Item 5 | Reputation | Reputation of the architect is acceptable. |
| Item 0 | Cost | The cost is higher than anticipated |
| Item 4 | Build time | The building will be available for us early. |
| Item 3 | Beauty | The building meets the standards of beauty that committee members and board members expect of a new project of this magnitude. |
| Item 1 | Style | The building style is not well matched to the liking of the donors. |
| Item 2 | Size and site | The design exceeds the size and site requirements in beneficial ways. |
| Item 5 | Reputation | Reputation of the architect is acceptable. |

Just as presentation ordering can be used to persuade, the lack of ordering that results from inputting factors into the two-dimensional interface and the reordering by weight, helps to eliminate effects of ordering when listening to and evaluating presentations or other provisioning of material. This is augmented by collecting factors first and placing them within the space only after the initial list of factors are identified.

16. Board Implementation

Figure 8A:
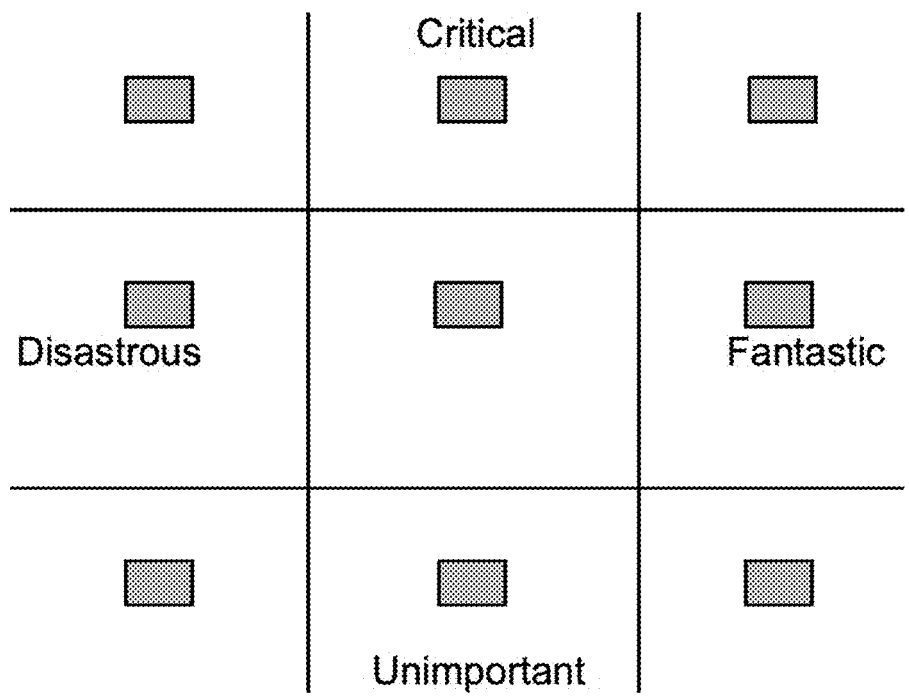
FIG. 8A-B illustrate an example of board game or kit according to specific embodiments of the invention, showing a schematic graph and a photographic representation.
Figure 8B:

In further specific embodiments, as mentioned elsewhere herein, the invention can be embodied as a mechanical device for assisting evaluations, which is referred to as the "decision support tool". or decision support kit. FIG. 8A-B illustrate an example of board game or kit according to specific embodiments of the invention, showing a schematic graph and a photographic representation.

In an example embodiment, a mechanical decision support kit includes: (1) A display board or pad of some type (such as a white board or large paper pad) with pre-printed labels (an example of which is illustrated below). (2) A tablet of analysis sheets for analysis and presentation. (3) A pad of blank sticky notes for writing in your own decision factors. (4) A pad of pre-printed sticky notes with commonly used library factors for decision types. (5) A special marker the erases easily from the laminated board. These elements are an example of a kit according to specific embodiments of the invention. Other kits may include somewhat fewer or greater numbers of elements as necessary to provide the claimed methods herein.

Example Instructions for Use:

In a particular embodiment, use of such a decision support kit will include two or more of the following steps:

1) Clear the board of all of sticky notes and erase all erasable printing.

2) Write decision being evaluated on the bottom of the board.

3) Using the pre-printed sticky-notes from the library or blank sticky-notes, write down each of the factors that are believed worth considering in the decision on a separate sticky-note and place that sticky-note on the laminated board located so as to indicate its importance and favorability.

4) After the Factors are satisfactorily positioned and/or rearranged, count the number of factors in each area of the laminated board and use the erasable marker to write the number in the gray box in the center of each area.

5) Use one of the analysis sheets from the analysis pad to analyze the decision. If the evaluation appears to be wrong, a user can consider moving the factors around until satisfied. A user may also consider adding factors or removing factors or combining similar factors together or splitting complicated ones into parts.

6) Once satisfied with a decision, use the "Presentation" section to create a presentation order for expressing the decision to others.

For decisions involving many options, use one decision kit for each option and place the laminated boards next to each other so to can see how they look by comparison.

To analyze a decision using a board according to specific embodiments of the invention, a user can sum the number of factors in each of the 9 areas of the decision space and write them there and sum all of the numbers in all of the areas to get the "grand total."

FIG. 9 illustrates a table such as can be used to read the analysis of the decision according to specific embodiments of the invention. If the total in the top row is more than 25% of the grand total, use only the first row. Squares with 2 or more are black, squares with 0 are white, and other squares are gray.

17. Example Reports

FIG. 10A-C illustrates example reports for a first example museum design option according to specific embodiments of the invention. FIG. 11A-C illustrates example reports for a second example museum design option according to specific embodiments of the invention. FIG. 12A-B illustrates example reports for a third example museum design option according to specific embodiments of the invention. FIG. 13 illustrates an example sorted matrix summary report related to the previous three figures according to specific embodiments of the invention. In these examples, various reports in various styles are shown to assist in the evaluation of a museum design, or, in other words, to help answer the question: which museum should I choose? The various tables presented will provide further illustrations of the present invention.

18. Example Users Manual

The following paragraphs include excerpts of a brief user's manual for a specific embodiment of the invention. Nothing in this example or in this application should be taken to limit the invention beyond what is provided in the attached claims. In the paragraphs below, an implementation according to specific embodiments of the invention is referred to as Decider™.

Decider provides a way to gather and present your Factors on a decision. It is designed to help people or groups make better decisions. It does this in several ways: (1) Decider provides a simple display of Factors about individual Yes/No Simple Decisions. Factors are displayed in terms of how important the Factor is compared to the other Factors and the extent to which the Factor favors or opposes the individual Yes/No Simple Decision. Each Factor includes a name and an explanation—provided by the user—and displayed while working on it. The user moves the Factors around till they reflect the individual preferences of that user. The "Center of Gravity" (COG) shows the aggregation of the Factors toward a Simple Decision. The "Mean" (M) shows the average of the locations of the Factors. (2) Decider stores groups of Factors together as an individual Decisions. Each individual YES/NO Simple Decision has a name and a description, provided by the user. The description of the Simple Decision is shown as Factors are put in context. A user can revisit Simple Decisions over time to update them to reflect changes in your Factors or the situation. A user can produce a report on a Decision including all of the details for a permanent record. (3) Decider helps facilitate groups of people making decisions. The facilitator works with the group to identify Decisions that are evaluated independently. As people in the group come up with more factors to be considered, those factors are added as new Decisions. Each person's view on each Decision is treated as an individual Factor within that Decision. The thinking behind each person's view is recorded and their name associated with those views. Each person decides where their Factor is placed within each Decision space. The aggregate view of the participants is seen as the COG for each Decision. Reports are generated for each decision. By allowing people to visualize, track, and codify those their Factors surrounding a Decision, Decider helps to clarify thinking and track the many complex issues involved in an overall Decision clearly.

Decider uses a computer program to calculate a weight for each Factor you identify to it, based only on the location of that Factor in the overall picture of what is important and how it affects the decision. The weight of all Factors are then combined with their positions to generate a weighted center of gravity (the COG) that identifies where the overall decision lies as of any given time. As Factors change the decision can change as well. It's up to the user to use the tool to help them gather and consider their own Factors and weigh them. The presentation also helps to understand more clearly what Factors need to be better addressed in order to settle an unsettled decision.

As a simple example, many high school students nearing graduate have to decide whether to try to go to college and, if they decide to go, to go to a Junior College first or a 4-year college directly, and if they get in, which college to go to. This is a complicated decision. Decider helps make complicated decisions by forcing the user to turn them into simple decisions and put their Factors about the simple decisions together. In the example here, the first step is to identify individual simple YES/NO decisions. The first one that seems obvious is whether to go to college or not, regardless of what path and how far the student will eventually go. But perhaps there is a chance to go to college later instead of right away? Again, this is a complicated decision that has to be broken down into simple decisions first for Decider to help you.

Step 1: Identify a simple YES/NO decision to start with. Once you have your simple YES/NO decision in mind, use New→Decision to create the new decision. Give it a short name (e.g., "College this fall?") and provide a short but sweet explanation (e.g., "Should I go to college this fall or not?").

Step 2: Start adding Factors about the decision. Lots of issues come up in making such a decision. As each issue comes to mind, add a Factor about that issue by using New→Factor and giving a name and a more detailed explanation. For example, College is expensive and so I would add a Factor with a name like "The cost!" and put in an explanation something like "College is really expensive and I don't have a lot of money, but I might be able to get a grant or scholarship or load.". Immediately other Factors come to mind—so I would probably add new Factors for "Grant" and "Loan". As each Factor is added, move it up or down for more or less important and left or right depending on whether it is favorable or unfavorable for going to college this fall.

Step 3: Move Factors around till they seem right to you. Moving Factors around helps clarify things. If one thing seems more important than another, it should be closer to the top. If one thing favors the decisions more than another it should be further to the right. The details of each Factor is shown in the bottom area of the screen as it is moves, and if your Factors change in the details, click on the name of the Factor to change the details. Sometimes the name changes as you think about it more. No problem, change the name as well. This moving of Factors around and changing them is important to getting a better understanding of your decision.

Step 4: Some Factors end up very important but neither favorable or opposed. If something is important to you and does not favor or oppose the decision, it needs to be resolved further, unless the COG of the decision is so clearly favorable or unfavorable that no matter what you do to clarify that issue, the decision won't change. If nothing will change the decision, the decision is made and Decider has served its purpose. If there are important and unresolved issues, they need to be resolved in order to make your decision. So focus in on them and resolve them. As you resolve them, move them around and see how the decision changes.

More advanced users of Decider can handle larger numbers of more complex decision by organizing them into Groups, creating and loading preset Decisions from libraries they define, and generating Group reports. Every Group consists of a set of Decisions kept together under a Group name. This provides a simple way to organize sets of Decisions. For example, if you have a complex decision about a project you are thinking of starting, you might decide to put all of the Decisions related to that project together into a Group so that similar decisions about different projects don't become confusing. When you are within a particular Group, the Group name appears in the Notes section of the screen when working on a Decision. Names of Groups and comments about them can be edited as well. The Save-As feature can save the Decision to a different Group, which is particularly handy for making your own library Group and copying from there to other Groups to repeat similar Decisions. Another are in which this is useful is in team processes where people work together to address a set of issues. Start by making a Decision called Team or something like that. Make one Factor for each team member, giving the Factor the member's name. Then, every time a new issue comes up, work on that Team Decision and immediately do a Save As giving it the name of the new Decision. Then move the Factors around to reflect the views of the team members (put it wherever they want it) and add comments to reflect the discussions by each member. When you make the final Decision, add it as a new Factor and place it appropriately on the screen. Group Reports provide a series of reports for each decision within the group and then a sorted roll-up report of the group as a whole in matrix report form. Details of reports are provided at the end of this menual Details of Functions and How to Use Them Decider presents with a window on the screen containing (1) a menu bar, (2) a display area, and (3) a comment area.

First, select an existing decision, change decisions groups and choose a decision there, or create a new decision. Once a decision is in the display area, assuming there are Factors present, you will see a set of Factors. To edit the contents of the text and related comments, or to delete the Factor click over the text. To move the box around the screen, grab it by holding the mouse button down over the number and moving the mouse. As you move it the color and number will change. This is how you move, edit, and delete Factors. The average of the Factors on the screen is shown by the blue box with the "M" in the middle (for Mean). The weighted average of the Factors on the screen is shown by the orange box with "COG" and a bulls eye in the middle (for Center of Gravity). The black "X" on the white background is the center of the display area.

The functions provided by Decider are invoked with the mouse. Data is entered with the keyboard. This is done from two areas; the menu bar at the top, and the large display area in the middle of the window. The top menu selector bar lists available groups. If there are stored Groups, they are available from this selection area. Click on the desired Group to update the Decisions list. If a current Decision is displayed, it will be saved when changing Groups. The New selection is used to create a new Decision or Factor within the current Decision. Decision will clear the current Decision and create a new Decision. If a current Decision is displayed, it will be saved. Factor will create a new Factor. After it is created, place it on the screen to reflect your current thinking. Group will create a new Group. After it is created, place it on the screen to reflect your current thinking. File: Save will save the current Decision. Save As will save a new copy of the current Decision under the name, within the Group, and with the comment you specify. Edit Decision will edit the current Decision name and comment. Delete Decision will delete the current Decision and all of its Factors. Edit Group will edit the current Group name and comment. Start/Stop Normalizing will turn on or off continuous normalizing of all importance values to move the average value (the Mean, not the COG) to average importance. It is automatically turned off when decisions are changed to prevent altering the content of a decision prior to human examination. While normalizing, the color of the bottom area does not get constantly updated as the mouse moves. Relabel will rotate through alternative top, bottom, left, and right labels for the screen. Colors will change the background color of the display area. Report will generate and display a report on the current Decision. Group Report will generate and display a report for the current Group.

The second menu bar lists available decisions. Click on 000-Select or "New"→"Decision" will clear the current decision and leave an empty display area. If a current Decision is displayed, it will be saved. If there are stored Decisions, they are available from the selection area. Click on the desired Decision to bring it to the display area. If a current Decision is displayed, it will be saved. The display area uses the mouse a bit differently. Move the mouse over any displayed item: This will cause a description to be listed in the bottom area of the window. Hold the mouse down and drag a box: This will change the importance and favorability of the Factor. Click on the text of a Factor: This will allow editing the Factor name and description.

19. Embodiment in a Programmed Digital Apparatus

The invention may be embodied in a fixed media or transmissible program component containing logic instructions and/or data that when loaded into an appropriately configured computing device cause that device to perform in accordance with the invention.

As will be understood to practitioners in the art from the teachings provided herein, the invention can be implemented in hardware and/or software. In some embodiments of the invention, different aspects of the invention can be implemented in either client-side logic or server-side logic. As will be understood in the art, the invention or components thereof may be embodied in a fixed media program component containing logic instructions and/or data that when loaded into an appropriately configured computing device cause that device to perform according to the invention. As will be understood in the art, a fixed media containing logic instructions may be delivered to a user on a fixed media for physically loading into a user's computer or a fixed media containing logic instructions may reside on a remote server that a viewer accesses through a communication medium in order to download a program component.

FIG. 14 shows an information appliance (or digital device) 700 that may be understood as a logical apparatus that can read instructions from media 717 and/or network port 719, which can optionally be connected to server 720 having fixed media 722. Apparatus 700 can thereafter use those instructions to direct server or client logic, as understood in the art, to embody aspects of the invention. One type of logical apparatus that may embody the invention is a computer system as illustrated in 700, containing CPU 707, optional input devices 709 and 711, disk drives 715 and optional monitor 705. Fixed media 717, or fixed media 722 over port 719, may be used to program such a system and may represent a disk-type optical or magnetic media, magnetic tape, solid state dynamic or static memory, etc. In specific embodiments, the invention may be embodied in whole or in part as software recorded on this fixed media. Communication port 719 may also be used to initially receive instructions that are used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language that may be used to create an ASIC or PLD that operates as herein described.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

What is claimed:

1. A system for representing and organizing and presenting factors related to making a decision comprising:
   multiple interconnected processing devices;
   a plurality of user moveable user interface objects on a display, controlled by at least one of the processing devices, wherein each user moveable user interface object represents a factor relating to making a decision;
   a two-dimensional area on the display, controlled by at least one of the processing devices, upon which said moveable user interface objects can be moved by a user, the two dimensional area having a favorableness axis and an importance axis;
   wherein a location of each moveable user interface object along each of the favorableness axis and the importance axis in said two-dimensional area indicates both an importance and a favorableness of the factor represented by said moveable user interface object, wherein a color shade or color intensity of the each moveable user interface object change as the moveable user interface object is moved within the two-dimensional area;
   means, controlled by at least one of the processing devices, allowing the user to move one or more of the factors such that multiple moveable user interface objects placed on said two-dimensional area provides a visual output indicating a characterization of the decision; and
   a processor configured to:
   read values for favorableness and importance of each factor based on the user's position of that factor on the two-dimensional surface;
   determine one or more statistical values related to the decision from the factor values;
   output a characteristic of the decision for a user.

2. The system of claim 1 further comprising one or more of:
   a computer, mechanical, or other processor;
   computer, mechanical, or other data store;
   computer, mechanical, or other input interface;
   computer, mechanical, or other output interface.

3. The system of claim 1 further comprising:
   wherein the movement of an object causes an additional observable result beyond the positional change of the object.

4. The system of claim 3 further wherein the additional observable result includes one or more of:
   a sound or change in sound, a reflection or change in reflection, a change in luminescence, a change in color, a change in symbols, movement of visible things, generation of electromagnetic emissions such as heat, microwaves, or radio frequency signals, a smell or change in smell, a chemical release or cessation of such release, a change in pressure, a change in temperature, a physical movement, removal of material from a substrate, transfer of material from one physical thing to another, the release or cessation in release of pheromones, a change in power consumption, a chemical process, the covering or revealing of something previously not covered or revealed, an action by a person or animal, the killing of a living thing, or the rotation of a gear or wheel.

5. A method for organizing and presenting factors related to making a decision using an information processing apparatus comprising:
   using a processor of the information processing apparatus to assign a plurality of factors related to making the decision each to a moveable factor indicator, said moveable factor indicator comprising elements on a graphical user interface;
   displaying, using the processor, said indicators on a display area of said information processing apparatus upon which said indicators can be moved by a user;
   wherein locations in said area of each moveable factor indicator indicate importance and favorableness of each moveable factor indicator with respect to making said decision, and wherein a color shade or color intensity of the each moveable user interface object change as the moveable factor indicator is moved within the display area;
   inputting importance and favorableness of one or more factors by directly moving the factor indicators;
   using the processor of the information processing apparatus to read a value from said factors and compute one or more statistical values related to the decision;
   using the processor to output one or more statistical values related to the decision; and
   such that multiple factors placed on said area provides a visual representation indicating a characterization of the decision.

6. The method of claim 5 further comprising:
   storing data regarding factors using computer, mechanical, or other data storage mechanisms;
   inputting factor descriptions using computer, mechanical, or other input mechanisms;
   moving factor indicators using computer, mechanical, or other output mechanisms.

7. The method of claim 5 further comprising:
   wherein positions on said area can be indicated by two coordinates, e.g., X and Y, X and R, etc.

indicating that movements that affect a first coordinate value are associated with importance of a factor, under whatever name may be given to importance;

indicating that movements that affect a second coordinate value are associated with favorableness of a factor, under whatever name may be given to favorableness.

8. The method of claim 5 further comprising:

changing moveable factor indicator characteristics in response to their position on said area.

9. The method of claim 8 further wherein said presentation characteristics include one or more of:

color and/or shading and/or visual patterns and/or sounds, and/or written explanations;

alphanumeric data displayed at said moveable indicator; and perceived size and/or shape of said moveable indicator.

10. The method of any of claim 5 further comprising:

calculating weight value associated with a moveable indicator, said weight value relating to said indicator's position; and presenting said weight value.

11. The method of claim 5 further comprising:

outputting one or more reports regarding said decision, said reports summarizing characterizations of said decision based on the selection and placement of factors.

12. The method of claim 11 further comprising:

said outputting one or more reports outputs one or more reports is selected from the group consisting of:

a factor values list indicating a plurality of factor values;

a TicTacToe Report;

a spreadsheet view;

a matrix report;

a favorable presentation;

an oppositional presentation.

13. The method of any of claim 5 further comprising:

including factors and decisions from one or more libraries, said libraries containing a number of pre-defined factors and/or decisions and/or locations and/or restrictions.

14. The method of any of claim 5 further comprising:

indicating that multiple individual decisions are related in a group; and outputting one or more reports regarding multiple decisions in a group, said reports summarizing relative characterizations of said decisions based on the selection and placement of factors for each decision.

15. The method of claim 14 further wherein:

changes in factors associated with one decision in a group are reflected in related changes to other factors within that same group.

16. The method of claim 15 further comprising one or more of:

factors may be associated such that changes in importance a factor in one decision will be reflected in other decisions in a group so that factor importance remains identical across decisions even if factor favorability differs across decisions;

factors may be associated such that changes in favorability of a factor in one decision will be reflected in other decisions in a group so that factor favorability remains identical across decisions even if factor importance differs across decisions;

factors may be associated such that changes in name of a factor in one decision will be reflected in other decisions in a group so that factor names remain the same across decisions; and changes in the locks on decisions or on factors or other options in one decision in a group will change corresponding options for other decision in said group.

17. The method of claim 5 further comprising:

restricting movement of factors or the addition, removal, or other alterations of factors to constrain inputs or situations based on previously set values or predefined conditions.

18. The method of claim 5 further wherein factors are comprised of or derived from votes in the form of evaluations provided by individuals or groups that are aggregated to form weights for the location of factors within the decision space.

19. The method of claim 5 further wherein dimensions of the space are displayed and/or analyzed so as to reflect cultural biases regarding the positioning and direction of increasing or improving importance or favorability.

20. The method of claim 5 further comprising:

placing one or more factors associated with different individuals within a decision space for each of one or more decisions;

calculating values associated with differences in locations within said decision space to one or more pairs of said factors; and producing output indicative of the differences in locations.

* * * * *